US012808719B2

(12) United States Patent
Vezard et al.

(10) Patent No.: US 12,808,719 B2
(45) Date of Patent: Nov. 24, 2026

(54) MULTI-TRACK RAMAN ANALYZER

(71) Applicant: HORIBA INSTRUMENTS INCORPORATED, Irvine, CA (US)

(72) Inventors: Nicolas Vezard, Edison, NJ (US); Aashish Tuladhar, Hillsborough, NJ (US); Chris George, Leonardo, NJ (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 67 days.

(21) Appl. No.: 19/037,340

(22) Filed: Jan. 27, 2025

(65) Prior Publication Data

US 2025/0189375 A1 Jun. 12, 2025

Related U.S. Application Data

(63) Continuation-in-part of application No. 18/087,341, filed on Dec. 22, 2022, now Pat. No. 12,281,986.
(Continued)

(51) Int. Cl.
*G01J 3/44* (2006.01)
*G01J 3/02* (2006.01)
(Continued)

(52) U.S. Cl.
CPC ........... *G01J 3/4406* (2013.01); *G01J 3/0208* (2013.01); *G01J 3/12* (2013.01); *G01N 21/65* (2013.01); *G01J 2003/1213* (2013.01)

(58) Field of Classification Search
CPC .......... G01J 3/4406; G01J 3/0208; G01J 3/12; G01J 2003/1213; G01N 21/65
See application file for complete search history.

(56) References Cited

U.S. PATENT DOCUMENTS 6,266,140 B1 7/2001 Xiang et al.
6,608,678 B1 8/2003 Potyrailo et al.
(Continued)

FOREIGN PATENT DOCUMENTS

CN 107976467 B 12/2019
CN 112113951 A * 12/2020 ........... G01N 21/031
(Continued)

OTHER PUBLICATIONS

A Raman Microprobe Optimized for Microarrays and Multiple-Well Plates by Fran Adar, Andrew Whitley, and Ruth Geiger; American Genomic/Proteomic Technology Sep./Oct. 2001.
(Continued)

*Primary Examiner* — Jamil Ahmed
(74) *Attorney, Agent, or Firm* — Brooks Kushman P.C.

(57) ABSTRACT

A spectroscopy system simultaneously obtains Raman measurements from multiple samples or multiple areas of a liquid or solid sample. At least two Raman probes simultaneously acquire spectra from the sample(s) using an imaging spectrometer having a single shared two-dimensional scientific CMOS sensor. Each probe is coupled to a laser, which may be integrated into the probe, and the spectrometer and includes a lens focusing laser light within or on the sample and collecting light from the sample for the spectrometer. The spectrometer images light from multiple probes simultaneously on the scientific CMOS sensor, spaced from one another to reduce crosstalk. A sample positioning device and a probe positioning mechanism may provide relative movement between samples or sample areas and the probes to acquire data from a different subset of samples or sample areas, and may also adjust probe distance from the sample(s) for desired laser focus spot size and location.

19 Claims, 22 Drawing Sheets

Related U.S. Application Data

(60) Provisional application No. 63/625,237, filed on Jan. 25, 2024, provisional application No. 63/293,733, filed on Dec. 24, 2021.

(51) Int. Cl.
*G01J 3/12* (2006.01)
*G01N 21/65* (2006.01)

(56) References Cited

U.S. PATENT DOCUMENTS

| | | | |
|---|---|---|---|
| 8,520,204 | B2 | 8/2013 | Desserouer |
| 10,725,059 | B2 | 7/2020 | Glezer et al. |
| 11,347,000 | B2 | 5/2022 | Ozcan et al. |
| 2015/0053870 | A1 | 2/2015 | Rumyantsev et al. |
| 2017/0010153 | A1 | 1/2017 | Vezard et al. |
| 2019/0187060 | A1 | 6/2019 | Clinton et al. |
| 2021/0302322 | A1 | 9/2021 | Tsai et al. |
| 2023/0204515 | A1 | 6/2023 | Vezard et al. |

FOREIGN PATENT DOCUMENTS

| | | | |
|---|---|---|---|
| CN | 113655026 | A | 11/2021 |
| EP | 2717052 | A2 | 4/2014 |
| JP | 2014-515496 | A | 6/2014 |
| JP | 2016180733 | A | 10/2016 |
| WO | 2014074569 | A1 | 5/2014 |

OTHER PUBLICATIONS

Identity Raman Reader by Digilab; Discover the ease and efficiency of Raman Spectroscopy with the Identity Raman Plate Reader; 2010.

Multiwell Raman plate reader for high-throughput biochemical screening, by Hiroyuki Kawagoe, Jun Ando, Miwako Asanuma, Kosuke Dodo, Tetsuya Miyano, Hiroshi Ueda, Mikiko Sodeoka & Katsumasa Fujita; Scientific Reports; (2021) <https://doi.org/10.1038/s41598-021-95139-8>.

Long Working Distance Raman Probe, Unique Raman probe with dual wavelength Raman measurement—one sheeter, by Spectra Solutions, Inc. 2019.

General Purpose Raman Probe—one sheeter, by Spectra Solutions, Inc. 2019.

Industrial Raman Probe—one sheeter, by Spectra Solutions, Inc. 2019.

Long Working Distance Raman Probe—one sheeter, by Spectra Solutions, Inc. 2019.

Raman Process Probe—one sheeter, by Spectra Solutions, Inc. 2019.

Search Report and Written Opinion dated Mar. 31, 2023 for related PCT Appln. No. PCT/US2022/053891; 41 Pages.

International Report on Patentability dated Jul. 4, 2024 for related PCT Appln. No. PCT/US2022/053891; 11 Pages.

Search Report and Written Opinion dated May 12, 2025 for related PCT Appln. No. PCT/US2025/013122; 16 Pages.

First Examination Report dated Jun. 4, 2026 for related Indian Application No. 202417052855, 9 pgs.

Notice of Reasons for Refusal dated Jun. 19, 2026 for related Japanese Application No. 2024-537891.

International Preliminary Examination Report dated Aug. 6, 2026 for related PCT Application PCT/US2025/013122.

Kawagoe, H., et al., "Multiwell Raman plate reader for high-throughput biochemical screening", Scientific Reports (2021) 11:15742 (https://doi.org/10.1038/s41598-021-95139-8 or www.nature.com/scientificreports (2021) 11:15742), Published Aug. 3, 2021, cited in IPER for PCT/US2025/013122 and Notice of Reasons for Refusal in JP App. 2024-537891.

* cited by examiner

MULTI-TRACK RAMAN ANALYZER

CROSS-REFERENCE TO RELATED APPLICATIONS

This application is a continuation-in-part of commonly owned and co-pending U.S. application Ser. No. 18/087,341 filed Dec. 22, 2022, which claims the benefit under 35 U.S.C. § 119(e) of U.S. App. No. 63/293,733 filed Dec. 24, 2021. This application also claims the benefit under 35 U.S.C. § 119(e) of U.S. App. No. 63/625,237 filed Jan. 25, 2024. The disclosures of which are hereby incorporated by reference in their entirety.

TECHNICAL FIELD

This disclosure generally relates to a multi-track analyzer that provides Raman measurements alone or in combination with fluorescence, absorbance, and/or other spectroscopic-based measurements of liquid samples that may be contained in a well plate, in vials, in flow cell(s) or of a solid sample, such as a wafer or disk.

BACKGROUND

Raman measurements may be used alone or in combination with fluorescence, absorbance, and/or other spectroscopic-based measurements for quality control and analysis of various substances during manufacturing. Liquid samples may be contained in a well plate, in separate vials, in flow cell(s), or moving through tubing, for example. Analysis of solid samples on a disk or wafer may also be performed.

Well plate or microplate readers are commonly used in life sciences and pharmaceutical drug applications for the quantification of biological and chemical assays in a microplate which can have hundreds or thousands of wells (cavities, tubes, channels, etc.). Optical properties of the samples may change as biological, chemical, biochemical, or physical reactions take place (usually at controlled temperatures). Absorbance, fluorescence intensity, and luminescence are typical detection methods. Automated readers for a well plate (or similarly, an array of vials) may be used to provide high throughput (high speed) testing per minute for typical well plates containing 8, 48, 96, or 384 wells, for example. While fluorescence, luminescence, and absorbance methods are used by many commercially available plate readers with well plates of various formats, including transparent, opaque, semi-transparent, and black colors, Raman plate readers are rare and slow due to a single well readout mode using a low-power laser and low sensitivity CCDs. Well plates may exhibit various background contributions from the selected material based on the type of reading (fluorescence, Raman, absorbance, etc.). As such, well plate characteristics (material, color, etc.) should be evaluated and selected specifically for Raman applications at the selected laser wavelengths.

A Raman microscope has been used as a microprobe for well plate reading. Another strategy involves scanning 96 to 384 wells with one Raman probe moving in relation to the well plate (with an X-Y stage). This solution involves 96 translation movements for a 96 well plate which reduces the overall throughput, i.e. time for data acquisition for the entire well plate. This strategy often sacrifices sensor exposure time per well to increase throughput (in wells processed/minute) and is typically a low sensitivity solution using a CCD sensor and low-power laser. In such case, a linear (or two-dimensional (2D), vertically binned) CCD is sufficient for single spectrum acquisition in the case of a single probe being used to record the signals from 96 wells one-by-one.

Another strategy for high-speed Raman well plate reading proposes a lens array optical setup (8×24 matrices with a separation of 4.5 mm), combined with non-polarized beam splitter cubes that split the output of a single laser to each of the multiple wells resulting in a laser power of only about 7.5 mW per channel. This approach provides static simultaneous acquisition of 192 wells. However, it is subject to increased stray light/crosstalk between adjacent wells relative to other strategies using individual standard Raman probes, which are carefully designed to eliminate crosstalk between the laser path and Raman path. The splitting of the laser in free space may also have stability issues with reduced sensitivity per channel and low signal-to-noise ratio (SNR) associated with low laser power, particularly for low concentration sample solutions. Another disadvantage of this approach is that it does not allow the simultaneous acquisition of fluorescence or other spectroscopic methods on a well plate array. The laser power may also not be adjusted up or down for a single probe or sub-section of the array of 192 wells.

Various other approaches are described in published patent application US2017/0010153A1 and in U.S. Pat. Nos. 8,520,204 and 6,266,140, for example.

Various life science applications, such as pharmaceutical drug development or manufacturing, may include vials of product moving on conveyor belts or liquid flowing through tubing, flow cells, square or round or hexagonal, etc.

Semiconductor, from development to manufacturing, may include wafer process monitoring and control, materials analysis, which may use a three-axis positioning mechanism to fully map a wafer using Raman, photoluminescence, or ellipsometry, but requires significant processing time when using a single probe due to crosstalk and signal to noise limitations. Slurries and liquid, plasmas, here again may be analyzed through flow cells, tubing or through a window or pluralities of windows.

Another application for the energy sector, particularly Hydrogen monitoring, can make use of Raman signal monitoring. Raman spectra may be acquired through windows on a chamber, flow cell, tubing, or using an immersion probe, although contamination becomes an issue in many applications. The challenge in all these applications is to achieve the best signal to noise, while keeping the system components' cost reasonable.

SUMMARY

As described in greater detail herein, a multi-track Raman analyzer and method include at least two Raman probes providing light from corresponding spots of a solid, liquid, or gas sample to the input of an imaging spectrometer having a shared two-dimensional sensor to simultaneously acquire Raman data for the corresponding spots and generate associated Raman spectra. Various types of sample holders and sample/probe positioning devices or mechanisms may be used to analyze several spots or areas of a single or multiple samples. The system and method may be used to analyze liquid samples ranging from clear solutions to slurries, solids/powders, gas or gas and liquid samples, and plasmas used for wafer manufacturing. Solid samples may include semiconductor products or wafers, food, packaging, recycled items, energy production ($H_2$), etc. Applications may include pharmaceutical manufacturing having a conveyor belt with two or more rows of vials, semiconductor process liquid flow cells containing wafer cleaning liquid or slurry, semiconductor wafers, etc. with analysis from side, top, or bottom, for example. Liquids flowing in tubing or flow cells may be analyzed with different samples flowing in parallel or a single flow cell with two or more probes aligned for cross-collection/excitation. Sample/probe positioning may be provided for rotational and/or translational relative movement between the probes and sample(s) with optional probe autofocus based on signals from a distance sensor detecting distance to a desired spot or surface of the sample, or based on Raman signal optimization or maximization.

In various embodiments, a system for obtaining Raman spectra from a sample includes at least one laser, at least two Raman probes each positioned to illuminate and receive light from a corresponding spot of the sample to simultaneously acquire Raman spectra of the sample, each Raman probe including an input optically coupled to the at least one laser, and a sample lens configured to receive light from the input, to focus the light from the input on the corresponding spot of the sample, to collect light from the corresponding spot of the sample, and to direct the collected light to an output, an imaging spectrometer optically coupled to the outputs of the at least two Raman probes, the imaging spectrometer including a diffraction grating (reflective or transmission) configured to direct light collected by the at least two Raman probes to a single two-dimensional scientific CMOS sensor, a sample positioning device configured to move the sample relative to the at least two Raman probes, a probe positioning mechanism configured to translate the at least two Raman probes along at least one axis, and at least one controller in communication with the at least one laser, the imaging spectrometer, the sample positioning device, and the probe positioning mechanism, the at least one controller programmed to simultaneously acquire Raman spectra for the corresponding spots of the sample based on signals from the two-dimensional scientific CMOS sensor of the spectrometer, and to control at least one of the sample positioning device and the probe positioning mechanism to change position of the at least two Raman probes relative to the sample. Each of the at least two Raman probes may include: an achromatic collimating lens positioned to receive light from the input; a mirror positioned to receive light from the achromatic collimating lens; a first dichroic longpass filter configured to reflect light from the mirror having wavelengths below a first cutoff wavelength to the sample lens, and to transmit light from the sample lens having wavelengths above the first cutoff wavelength; a second dichroic longpass filter configured to transmit light received from the first dichroic longpass filter having wavelengths above a second cutoff wavelength and to reflect light having wavelengths below the second cutoff wavelength; and an achromatic collection lens configured to focus light transmitted through the second dichroic longpass filter to the output. The Raman probes may be positionally fixed relative to one another and move together relative to the sample in response to a signal from the at least one controller. The sample positioning device may include a rotational stage configured to rotate the sample in response to a corresponding signal from the at least one controller. The probe positioning mechanism may be configured to translate the Raman probes along orthogonal X, Y, and Z axes relative to the sample positioning device in response to corresponding signals from the at least one controller. In various embodiments, the probe positioning mechanism is configured to translate the at least two Raman probes to control distance between the probes and the sample in response to corresponding signals from the at least one controller.

In one or more embodiments, the output of each of the Raman probes is optically coupled to an input of the spectrometer by at least one optical fiber. The optical fibers from the Raman probes may be linearly arranged at the input of the spectrometer with optical fibers from each Raman probe spaced from optical fibers of another of the Raman probes by at least one optical fiber diameter. In one embodiment, the output of each of the Raman probes is optically coupled by a plurality of optical fibers to the input of the spectrometer with the optical fibers from each Raman probe spaced from optical fibers of another of the Raman probes by a plurality of inactive optical fibers. In one embodiment, seven (7) active optical fibers for a first Raman probe are arranged linearly adjacent one another with five (5) inactive fibers between the active fibers of the first Raman probe and active optical fibers of a second Raman probe.

In one or more embodiments, the system includes a plurality of lasers with each of the plurality of lasers optically coupled to the input of a single different one of the Raman probes. In another embodiment, the system includes a plurality of lasers with each laser integrated with a corresponding Raman probe. The integrated laser may be contained within a housing of a corresponding one of the Raman probes. In another embodiment, the system includes a plurality of lasers with at least two of the plurality of lasers coupled to the input of a single one of the Raman probes. In yet another embodiment, a single laser is coupled to the inputs of at least two of the Raman probes.

Embodiments may also include a system having at least two Raman probes positioned with corresponding probe outputs aligned along a common axis wherein the system is configured to facilitate movement of the sample between the corresponding probe outputs. The sample positioning device may be implemented by a tube, cuvette, or flow cell positioned between the corresponding probe outputs and configured to flow the sample through the tube, cuvette, or flow cell. The controller may be programmed to sum or otherwise combine the scientific CMOS signals from the Raman probes to generate combined Raman spectra with laser light output from the at least two probes focused on the same spot of the sample. The sample positioning device may comprise a conveyor or other material handling system configured to move vials containing samples between the opposing probe outputs. The scientific CMOS sensor's integrated electronics may also be designed and programmed to combine Raman spectra as needed, in each channel, and to ignore the inter-channel readout areas.

Various embodiments may include a system for obtaining Raman spectra of moving liquid samples that includes: at least one laser; at least two Raman probes each positioned along a common axis on opposite sides of the moving liquid samples to illuminate and receive light from a corresponding spot of the moving liquid samples to simultaneously acquire Raman spectra of the samples, each Raman probe including an input optically coupled to the at least one laser, and a sample lens configured to receive light from the input, to focus the light from the input on the corresponding spot of the sample, to collect light from the corresponding spot of the sample, and to direct the collected light to an output; an imaging spectrometer optically coupled to the outputs of the at least two Raman probes by a plurality of optical fibers, the optical fibers of the at least two Raman probes linearly arranged at an input of the imaging spectrometer, the imaging spectrometer including a diffraction grating configured to direct light collected by the at least two Raman probes to a single two-dimensional sensor; and at least one controller in communication with the at least one laser and the imaging spectrometer, the at least one controller programmed to simultaneously acquire Raman spectra for the corresponding spots of the sample based on signals from the two-dimensional sensor of the spectrometer.

In various embodiments, the moving liquid samples comprise liquid moving through a tube (round, square, or other shape) positioned between the outputs of the Raman probes with the Raman probes each having corresponding output laser light focused on the same spot of the moving liquid samples moving through the tube. The controller may be programmed to sum signals from the two-dimensional sensor corresponding to outputs of the at least two Raman probes to generate combined Raman spectra. In one embodiment, the two-dimensional sensor is a shutterless CCD sensor. In another embodiment, the two-dimensional sensor is a scientific CMOS sensor.

Various embodiments of the system include a plurality of lasers with each of the plurality of lasers optically coupled to the input of a single one of the Raman probes. In other embodiments, each Raman probe includes an integrated laser that may be contained within a housing of the probe. In one embodiment, the system includes a plurality of lasers with at least two of the plurality of lasers coupled to the input of a single one of the Raman probes. In another embodiment, the system includes a laser coupled to the inputs of at least two of the Raman probes. In other embodiments, a laser is integrated within the Raman probe In various embodiments, the moving liquid samples comprise vials containing the liquid samples with the vials moving between the outputs of opposing Raman probes via a material handling system with the opposing Raman probes having corresponding output laser light focused at a spot within different vials. In these embodiments, the two-dimensional sensor comprises a scientific CMOS sensor, the optical fibers associated with each Raman probe are positioned adjacent to one another and spaced by a distance corresponding to at least one fiber diameter from fibers associated with other Raman probes, and the controller is programmed to generate separate Raman spectra using signals from the scientific CMOS sensor for each Raman probe read simultaneously and independently. The system may include a separate laser coupled to the input of each Raman probe. In various embodiments, each Raman probe includes an integrated laser, an achromatic collimating lens positioned to receive light from the laser, a mirror positioned to receive light from the achromatic collimating lens, a first dichroic longpass filter configured to reflect light from the mirror having wavelengths below a first cutoff wavelength to the sample lens, and to transmit light from the sample lens having wavelengths above the first cutoff wavelength, a second dichroic longpass filter configured to transmit light received from the first dichroic longpass filter having wavelengths above a second cutoff wavelength and to reflect light having wavelengths below the second cutoff wavelength, and an achromatic collection lens configured to focus light transmitted through the second dichroic longpass filter to the output.

Embodiments may also include a system for obtaining Raman spectra of flowing liquid samples including at least two lasers, at least two Raman probes each positioned along a path of the flowing liquid samples to illuminate and receive light from a corresponding spot of the flowing liquid samples to simultaneously acquire Raman spectra of the samples, each Raman probe including an input optically coupled to a respective one of the at least two lasers, and a sample lens configured to receive light from the input, to focus the light from the input on the corresponding spot of the sample, to collect light from the corresponding spot of the sample, and to direct the collected light to an output, an imaging spectrometer optically coupled to the outputs of the at least two Raman probes by a plurality of optical fibers, the optical fibers of the at least two Raman probes linearly arranged at an input of the imaging spectrometer with optical fibers associated with each probe positioned adjacent to one another, the imaging spectrometer including a diffraction grating configured to direct light collected by the at least two Raman probes to a single two-dimensional scientific CMOS sensor, and at least one controller in communication with the at least one laser and the imaging spectrometer, the at least one controller programmed to simultaneously acquire Raman spectra for the corresponding spots of the sample based on signals from the two-dimensional CMOS sensor of the spectrometer. In one embodiment, the Raman probes have outputs aligned along a common axis in opposite directions with the flowing liquid passing between the outputs and the controller is programmed to sum the signals from the two-dimensional cMOS sensor to generate combined Raman spectra corresponding to the at least two Raman probes. In various embodiments, the optical fibers associated with each probe are spaced by a distance corresponding to at least two fiber diameters from fibers associated with other Raman probes coupled to the imaging spectrometer and the controller is programmed to generate separate Raman spectra associated with each Raman probe.

Embodiments may also include a method including simultaneously focusing laser light on at least two spots of a solid sample, simultaneously directing light from the at least two spots to an imaging spectrometer having a diffraction grating (reflective or transmission) that redirects light at a wavelength-dependent angle to a shared two-dimensional scientific CMOS sensor, acquiring Raman spectroscopy data associated with the at least two spots from the shared two-dimensional scientific CMOS sensor, and controlling, by at least one controller, rotation of the solid sample and translation of the focused laser light to simultaneously acquire Raman spectroscopy data from at least two different spots of the solid sample. Simultaneously focusing laser light may include simultaneously focusing light from a different laser associated with each one of the at least two spots. Simultaneously directing light from the at least two spots may include coupling the light from each of the spots to at least one corresponding optical fiber and arranging the optical fibers in a linear array at an input of the spectrometer, the at least one optical fiber associated with each spot separated from optical fibers associated with another spot by a distance corresponding to at least one optical fiber diameter. In various embodiments, rotation of the solid sample is controlled independently from translation of the focused laser light. Translation of the focused laser light may include translation in orthogonal X, Y, and/or Z directions relative to the solid sample.

A system and method for simultaneously obtaining spectroscopic measurements from at least two liquid samples contained in an array of sample holders, such as a microplate or well plate, may include an imaging spectrometer with a two-dimensional sensor receiving light emitted by the at least two samples during illuminate by focused laser light that is directed to an input of the spectrometer and diffracted by a diffraction grating of the spectrometer. The spectroscopic measurements may include Raman and fluorescence measurements, in addition to various other measurements obtained with the same spectrometer or a different spectrometer. To reduce sample-to-sample crosstalk and improve signal-to-noise ratio (SNR), the at least two samples may be separated or spaced by at least one sample holder or well of the array that is not illuminated by focused laser light during the measurements. To reduce channel-to-channel crosstalk and further improve SNR, light imaged on the spectrometer sensor from each of the samples is spatially separated from light of any other samples corresponding to Raman and/or fluorescence measurements. Spectroscopic probes may be fiber coupled to the spectrometer and illuminating laser(s) or other light source(s) to facilitate positioning of the probes within the filling and reaction chamber of an automated liquid handling system, with the laser(s), other light source(s), one or more controllers, and spectrometer(s) positioned outside the reaction chamber. A calibration standard may be integrated within a well plate holder for automated periodic calibration and adjustment of the laser wavelength, intensity, and/or focus.

In one embodiment, a system for obtaining Raman spectra from liquid samples within an array of sample holders includes at least one laser, at least two Raman probes each positioned perpendicular to the array of sample holders and aligned to simultaneously acquire Raman spectra of the liquid samples in non-adjacent sample holders, each Raman probe including an input optically coupled to the at least one laser, and a sample lens configured to receive light from the input, to focus the light from the input within an associated liquid sample, to collect light from the associated liquid sample, and to direct the collected light from the associated liquid sample to an output, a spectrometer optically coupled to the outputs of the at least two Raman probes, the spectrometer including a diffraction grating configured to direct light collected by the Raman probes to a sensor, a mechanical positioning mechanism configured to adjust a relative position between the array of sample holders and the at least two Raman probes, and at least one controller in communication with the at least one laser, the spectrometer, and the mechanical positioning mechanism, the at least one controller programmed to generate Raman spectra based on signals from the sensor of the spectrometer for the liquid samples of the at least two non-adjacent sample holders, and control the positioning mechanism to change position of the at least two Raman probes relative to the array of sample holders to simultaneously acquire Raman spectra of the liquid samples in different non-adjacent sample holders of the array.

In various embodiments, each Raman probe includes an achromatic collimating lens positioned to receive light from the input, a mirror positioned to receive light from the achromatic collimating lens, a first dichroic longpass filter configured to reflect light from the mirror having wavelengths below a first cutoff wavelength to the sample lens, and to transmit light from the sample lens having wavelengths above the first cutoff wavelength, a second dichroic longpass filter configured to transmit light received from the first dichroic longpass filter having wavelengths above a second cutoff wavelength and to reflect light having wavelengths below the second cutoff wavelength, and an achromatic collection lens configured to focus light transmitted through the second dichroic longpass filter to the output. The Raman probes may also include at least one bandpass filter positioned in an optical path between the achromatic collimating lens and the mirror. In various embodiments, the output of each Raman probe is optically coupled to an input of the spectrometer by at least one optical fiber, with the optical fibers from the Raman probes linearly arranged at the input of the spectrometer, with optical fibers from each Raman probe spaced from optical fibers of another of the Raman probes by at least one optical fiber diameter. The spacing may be provided by one or more inactive or dead optical fibers that do not carry light placed in the linear array of fibers between fibers associated with a Raman or fluorescence probe. The optical fibers from the Raman probes may be arranged nearer to a center of the linear array than the output optical fibers from the fluorescence probes so that light from the Raman probes is directed nearer to an optical axis of the sensor of the spectrometer than light from the fluorescence probes.

In one or more embodiments, the spectrometer(s) include a diffraction grating comprising a reflective aberration corrected holographic concave grating and the sensor comprises a two-dimensional imaging sensor, such as a scientific CMOS sensor, or a CCD sensor with a shutter. In one embodiment all of the Raman probes and fluorescence probes are optically coupled to a single spectrometer having a single two-dimensional sensor. Other embodiments include a spectrometer having a separate diffraction grating for each connected probe with a linear CCD sensor shared by two or more probes. Embodiments may also include a separate spectrometers optimized for either fluorescence/photoluminescence data or Raman data and optically coupled to associated probes. The spectrometer may include a slit positioned in an optical path between the optical fibers from each Raman probe and the diffraction grating of the spectrometer. The slit width may be selectable from a plurality of fixed-width slits by at least one controller, or may have a variable width controlled by at least one controller.

The mechanical positioning mechanism may be configured to move the array of sample holders relative to the at least two Raman probes (and fluorescence probes when present) to orthogonal X and Y positions corresponding to the sample holders in the array. A Z-axis position may also be controlled to vary position of focused laser light within the samples. The positioning mechanism may include a well plate holder having one or more integrated calibration standard samples, such as a diamond sample. In addition, the well plate holder may be configured to hold a calibration plate having one or more calibration standard samples, such as diamond, silicon, and/or wells containing a customized liquid calibration sample for a particular application. The at least one controller may be programmed to change relative position between the Raman probes and the array of sample holders to vary position of focused laser light within the liquid samples while acquiring data from the spectrometer sensor to generate the Raman spectra to provide reduce or eliminate localized heating and/or photo bleaching of the sample and to improve homogeneity of the sample and/or averaging of measurements from different positions within the samples.

Various embodiments may include at least one laser associated with each Raman probe, or with a small number of Raman probes, such as two to four probes, for example. The laser may be a single mode or multi-mode laser. A separate light source may be provided for the fluorescence/photoluminescence probes with multiple fluorescence/photoluminescence probes connected to a single light source. Raman and fluorescence/photoluminescence probes may be implemented as non-contact, or as immersion probes. The Raman probes and fluorescence/photoluminescence probes may be positioned either above or below the samples, and may be positioned perpendicular to the array of samples. In one embodiment, the laser source light focused on or within the samples is spatially offset from the Raman probe, either at an angle or perpendicular to the array of samples. Illuminating light sources may be positioned opposite to collecting light sources of the probes to provide transmission Raman or fluorescence measurements.

In one embodiment, an additional laser is optically coupled to an input of an additional Raman probe, the additional Raman probe having an output coupled to the spectrometer, and positioned to acquire Raman spectra of a reference sample not contained in the array of sample holders.

In one or more embodiments, a system for obtaining Raman spectra from liquid samples contained within a well plate includes at least one laser optically coupled to at least two fibers to selectively focus laser light within samples contained within at least two wells of the well plate, the at least two wells separated by at least one well that is not illuminated by focused laser light, at least two Raman probes, each Raman probe aligned with an associated one of the at least two wells of the well plate illuminated by the focused laser light, each Raman probe including a lens configured to focus light from an associated sample on an output of the Raman probe, a spectrometer optically coupled to the outputs of the at least two Raman probes, the spectrometer including a diffraction grating configured to direct light collected by the at least two probes to a shared sensor, a mechanical positioning mechanism configured to adjust a relative position between the well plate and the at least two Raman probes, and at least one controller in communication with the spectrometer and the mechanical positioning mechanism, the at least one controller programmed to generate Raman spectra based on signals from the shared sensor of the spectrometer for the liquid samples within the at least two wells, and control the positioning mechanism to change relative position between the at least two probes and the well plate to simultaneously acquire Raman spectra of the liquid samples within at least two different wells of the well plate. The relative position may include three-dimensional positioning of the well plate relative to the probes. Each of the at least two fibers may focus laser light within an associated one of the at least two wells at an angle relative to an associated one of the at least two Raman probes collecting light emitted from associated samples. The fibers may be positioned to focus the laser light within the samples from an opposite direction relative to the Raman probes. The system may include a separate laser associated with each of the fibers. The spectrometer may include a two-dimensional sensor wherein the outputs of the Raman probes are connected to an input of the spectrometer by corresponding optical fibers arranged in a linear array at the input of the spectrometer with optical fibers associated with each probe positioned adjacent to one another and spaced by a distance corresponding to at least one fiber diameter from fibers associated with other probes.

In various embodiments, the system includes a plurality of fluorescence probes corresponding in number to the plurality of Raman probes, each fluorescence probe being fixed for movement with an associated Raman probe, the fluorescence probes aligned with associated wells of the well plate that are spaced by at least one well not aligned with any other fluorescence probe or any of the Raman probes. The fluorescence probes may be optically coupled to the input of the spectrometer and the at least one controller may be further programmed to simultaneously obtain fluorescence data from the shared sensor. In some embodiments, the fluorescence probes may be aligned with the same wells as the Raman probes with simultaneous Raman exposure sequentially followed by simultaneous fluorescence exposure for each subset or group of wells associated with the probes. The shared sensor may include a two-dimensional scientific CMOS sensor or CCD sensor with a shutter.

In one or more embodiments, the outputs of the at least two Raman probes are connected to an input of the spectrometer by corresponding optical fibers, each of the plurality of fluorescence probes is coupled by at least one optical fiber to the input of the spectrometer, optical fibers of each Raman probe are linearly arranged and grouped together, optical fibers of each fluorescence probe are linearly arranged and grouped together, grouped optical fibers of each Raman probe are spaced by a distance corresponding to at least one fiber diameter from grouped optical fibers of any other Raman probe or any fluorescence probe, and grouped optical fibers of each fluorescence probe are spaced by a distance corresponding to at least one fiber diameter from grouped optical fibers of any other fluorescence probe or any Raman probe. The grouped optical fibers of each Raman probe may be positioned closer to a center of the linear arrangement than the grouped optical fibers of each fluorescence probe. The Raman probes, the fluorescence probes, the at least two fibers coupled to the at least one laser, and the mechanical positioning mechanism may be positioned inside a reaction chamber of an automated liquid handing system, with the spectrometer and the at least one laser positioned outside of the reaction chamber. The mechanical positioning mechanism may include a well plate holder having an integrated calibration standard sample positionable by the at least one controller to align with one or more of the probes. Wavelength and/or intensity of a laser associated with the corresponding probe(s) may be adjusted in response to measurements obtained from the calibration standard sample. In some embodiments, the system may include a second spectrometer optimized for fluorescence measurements having an input optically coupled to outputs of the plurality of fluorescence probes.

Embodiments may also include a method comprising simultaneously focusing laser light within at least two samples contained in corresponding wells of a well plate, the at least two samples contained in wells spaced by at least one well without focused laser light, simultaneously directing light emitted by the at least two samples to a spectrometer having a diffraction grating that redirects light at a wavelength-dependent angle to a shared sensor, acquiring Raman spectroscopy data associated with the at least two samples from the shared sensor, and controlling, by at least one controller, positioning of the well plate relative to the focused laser light to simultaneously acquire Raman spectroscopy data from at least two different samples contained in previously unexamined wells of the well plate. Simultaneously focusing laser light may include simultaneously focusing light from a different laser associated with each one of the at least two samples. The method may also include simultaneously directing light from a source to at least two samples contained in corresponding wells of the well plate, each well spaced by at least one well not illuminated by the focused laser light or light from the source, simultaneously directing light emitted by the samples illuminated by the light from the source to the shared sensor of the spectrometer, and acquiring fluorescence data from the shared sensor of the spectrometer associated with the at least two samples illuminated by the light from the source.

In at least one embodiment, simultaneously directing light emitted by the at least two samples comprises coupling the emitted light to at least one optical fiber for each of the at least two samples, and arranging the optical fibers in a linear array at an input of the spectrometer, the optical fibers associated with each sample grouped together and separated from optical fibers associated with another sample by a distance corresponding to at least one optical fiber diameter.

Various embodiments may also include, by the at least one controller, positioning a calibration standard integrated within a well plate holder to be illuminated by the focused laser light, acquiring Raman spectroscopy data from the calibration standard, and adjusting wavelength of the focused laser light based on the Raman spectroscopy data of the calibration standard compared to a previously stored peak wavelength for the calibration standard.

One or more embodiments according to the disclosure may provide associated advantages. For example, various embodiments provide for high throughput Raman measurements obtained using Raman spectroscopy and spatially offset Raman spectroscopy (SORS) as well as various combinations of Raman spectroscopy with absorbance measurements, fluorescence intensity, luminescence, time-resolved fluorescence, alpha screen, and many other types of spectroscopic and non-spectroscopic measurements of samples contained in a well plate. Embodiments may provide whole well imaging using various types of two-dimensional (2D) sensors, such as one or more CCD, CMOS or scientific CMOS (scientific CMOS) sensors. Using a laser at its full power/well (any typical UV, VIS and NIR laser, commonly 532 nm and 785 m), or with laser output split between a few wells maintains the laser output/channel reasonably high and facilitates adjustments to laser wavelength and/or intensity for associated probes. Allocating a Raman probe for each channel ensures best sensitivity, low stray light, and maximized SNR. The system may provide auto-calibration using one or more calibration standards embedded in the plate holder, or a calibration well plate containing one or more calibration standards and/or wells configured to contain liquid calibration samples. Fiber-coupled Raman probes may be incorporated with an automated plate handler system positioned inside the filling and reaction chamber and coupled to remotely positioned lasers and spectrometer to facilitate real-time or near real-time spectra acquisition for live monitoring of reactions within the well plate without quenching or dilution prior to analysis. Various embodiments may include integration with an automated plate handler system having automated transfer of a well-plate from a filling and reaction chamber to an analysis chamber for Raman data acquisition by the multi-probe system.

DETAILED DESCRIPTION

Figure 1:
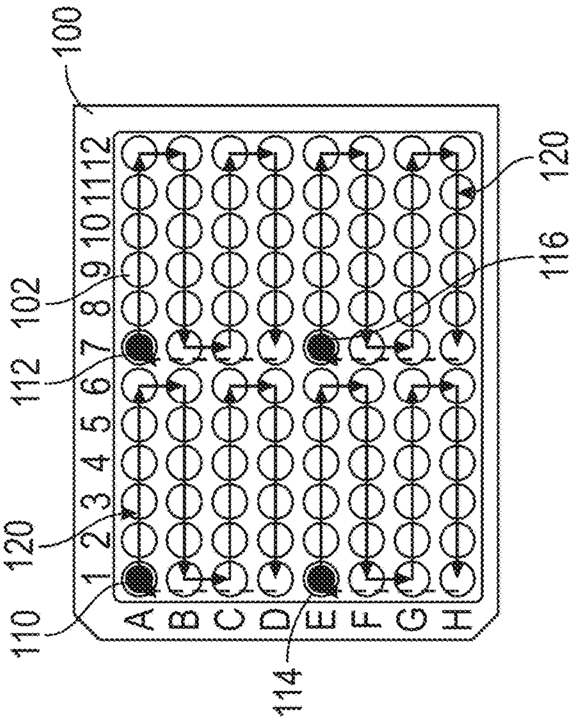
FIG. 1 illustrates a representative scanning pattern for a well plate having four Raman probes.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described in this disclosure, a well plate refers to a flat plate or tray having multiple wells spaced from one another and configured to contain a liquid sample that typically ranges in volume of nanoliters to milliliters of liquid. Well plates often contain 96, 384, or 1,536 wells, although may be customized for particular applications. A well plate may also be referred to as a multi-well plate, a microplate, a microtiter plate, a microwell plate, or similar variations. Well plates may be made of molded plastic, such as polystyrene, polypropylene, or polycarbonate, or may include a more complex construction to provide desired properties for particular types of measurements. Well plates may be transparent or pigmented with white or black pigments, for example, to provide desired optical characteristics suitable for particular desired measurements. Similarly, well plate measurements may be obtained with open cells or may have a lid or cover placed over the cells after depositing the samples.

One or more configurations of a well plate reader according to the disclosure provide rapid readout of a well plate using multiple Raman probes arranged in an array with a laser associated with each well being read to facilitate full-power laser operation. Commercially available UV, VIS, or NIR lasers may be used. Many applications use lasers operating at 532 nm or 785 nm). This configuration allows individual laser power adjustment for each of the respective mapped/related portion of wells scanned by that laser. For example, a well plate having 96 wells including 4 probes each having an associated laser would allow laser power to be individually adjusted for each of the 4 areas including 24 wells. This facilitates processing of wells containing different sample concentrations while reducing or eliminating the risk of localized heating and/or photo bleaching of the sample materials during reading. In some configurations, one or more lasers may include an output split among a small number of wells (using associated fibers, for example) to maintain a desirable laser output/channel with a full light-tight Raman probe associated with each channel to ensure best sensitivity, low stray light, and desired SNR. The probe array may consist of Raman probes or a combination of Raman and fluorescence probes, or various other types of probes.

A two-dimensional (2D) CCD sensor may be used in a known configuration using a commercially available spectrograph and CCD camera arrangement to acquire spectra from a large number of wells simultaneously. For example, an Isoplane™ (Roper Princeton Instruments) spectrometer may be configured with a Pixis Isoplane™ (Roper Princeton Instruments) CCD camera, both available from Teledyne Princeton Instruments, Inc. Conventional CMOS sensors have exhibited too much dark current and insufficient thermoelectric (TE) cooling, to be used in high-speed Raman set-ups. One or more embodiments according to this disclosure may use a compact scientific CMOS (scientific CMOS) sensor/camera, such as the Sylent-Blue from HORIBA Instruments Incorporated that achieves low read noise in the range of sub 1e- to 2e- and low dark current (sub 1e-/pixelsec) integrated in cameras reaching −25 C to −40 C with air or water TE vacuum cooling. This allows almost noise-free Raman spectra to be acquired in the described embodiments simultaneously. Such scientific CMOS sensors would typically be backside-illuminated (BSI) (also known as back-illuminated (BI) or back-thinned (BT)) sensors to achieve high quantum efficiency (QE), near 95% in the visible range.

Scientific CMOS sensors eliminate the need for a shutter when using a 2D CCD (a subject carefully avoided in the Isoplane/Pixis configuration) since such problem is present with full frame CCDs, and is only eliminated with an Interline CCD (shutterless), which unfortunately features very low quantum efficiency (QE). Frame transfer CCDs are typically not used due to their unaffordable costs and size, but may be used for specialized applications. An imaging spectrometer, such as many of the compact imaging spectrometers available from HORIBA Instruments Incorporated, combines high spectral resolution (required for Raman) with multiple fiber input (arranged along the slit) capability. A CiCi-Raman-532 HORIBA spectrometer, in which the CCD is replaced with the Sylent TE cooled CMOS camera features 4 to 12 channels, with a high sensitivity per channel if properly configured with custom fiber bundles (see possible arrays with 1 to 7 active fibers per channel, separated by 1, 2, 3 or more dead fibers used for spacing and crosstalk minimized well below 1%) and optimized slit widths (optional for high resolution requirements)

according to one or more embodiments described herein. Active fiber channels may be linearly arranged in two or more columns shifted or offset from one another.

As recognized by the inventors of this disclosure, the need to provide high throughput well plate readers may be addressed by combining Raman probes/lasers and fluorescence (FLUO) probes/sources in a hybrid array, allowing simultaneous acquisitions of Raman and fluorescence measurements from different wells, which avoids crosstalk as well as reduces the lengthy processing time otherwise associated with sequential acquisitions. In addition, all spectra may be collected on the same imaging spectrometer with a scientific CMOS sensor that may be optionally cooled. The fluorescence typically covers broad spectral regions while Raman is for narrow ranges (3,000-4,000 of 1/cm). In comparison with a Raman only configuration, a hybrid system may require translations between the probes and the well plate so that the two combined arrays of Raman and fluorescence probes can be positioned to cover all wells. Because the Raman and fluorescence probes are not positioned to focus into the same wells at the same time, there is no significant stray light or crosstalk (such as crosstalk from the laser to fluorescence measurements, or fluorescence measurements to Raman), and there is no need to turn the light sources for the Raman and fluorescence measurements ON/OFF consecutively. As such, there is a significant reduction of total acquisition time for the entire well plate. All probes may be positioned above the well plate, or some probes may be positioned below the well plate depending on the particular configuration. Two arrays of probes may be provided (Raman and fluorescence), which may be non-adjacent, moving on the same stage or on two separate stages if one array is located on top of the well plates and the other is located below the well plates. The latter configuration may require wells having flat transparent well bottoms for best performance.

In some configurations, a hybrid system may include both Raman and fluorescence probes that are positioned to read the same well. For example, a Raman probe and a fluorescence probe may be aimed at the same well at slight angles (away from perpendicular) with the Raman and fluorescence readings performed sequentially for that well prior to the stage (or probes, depending on the application) being adjusted to read the next well.

A representative array of sample holders implemented as a well plate 100 and associated scanning pattern for a multi-probe plate reader is illustrated in FIG. 1. The well plate 100 is shown in a top/bottom or plan view with wells 102 arranged in a rectangular array with twelve columns and eight rows providing a total of 96 wells extending into or out of the plane of the drawing that may be filled with liquid samples. As previously described, well plates or microplates are commercially available in different sizes with common configurations including arrays of 48, 96, 192, 384 or 1,536 wells. While a rectangular array is illustrated, other configurations are possible, such as an array having offset alternating rows, for example, or having two different arrays of the same or different shapes/configurations separated by space therebetween. Those of ordinary skill in the art will recognize that the claimed subject matter is generally independent of the particular configuration or number of wells or other sample holders within an array. Similarly, the well plate may be made of various types of materials having characteristics suitable for a particular type of liquid sample as previously described. The well plate or other sample holder material may be selected to provide desirable optical properties for spectroscopic analysis. For example, black or otherwise optically opaque or absorbing wells may be used to reduce or eliminate stray light and well-to-well crosstalk during exposure for reading while simultaneously acquiring spectroscopic measurements from multiple wells. Various system optical components may also be selected or adjusted to optimize one or more desired system parameters, such as sensitivity, exposure time and related throughput, SNR, etc. based on optical characteristics of a selected well plate material.

The well plate 100 may include a cover (not shown) that is placed over the wells to contain the liquid samples. The cover may remain in place, or may be removed during spectroscopic analysis, depending on the particular application and implementation. In this example, the reader includes four (4) Raman probes configured to simultaneously read four wells with an initial position as indicated by solid dots 110, 112, 114, and 116. In this example, the well plate is translated in the x-y plane by an associated mechanical positioning mechanism including a well plate holder in a pattern as represented by the arrows 120 so that each probe will read one of its associated 24 wells, with the four probes reading a corresponding four wells of the well plate simultaneously. Alternatively, the probes may be translated relative to the well plate. Use of multiple probes simultaneously captures spectra from multiple wells, reducing the number of x-y movements relative to applications with fewer probes or a single probe, to increase system throughput.

As illustrated in FIG. 1, the four probes are aligned with non-adjacent wells to reduce stray light from other probes and associated well-to-well crosstalk. In the representative configuration shown, probe position 110 is separated by five wells from probe position 112, and by four wells from probe position 114. Spacing of probes may vary depending on the specific requirements of each application, which may include the optical properties of the liquid samples, the well plate material, laser wavelengths, sample concentration, etc. In the example of FIG. 1, adjacent wells for probe position 110 would include wells at positions A2, B1, and B2, with all other wells being non-adjacent to probe position 110 (A1). Similarly, adjacent wells for probe position 116 include wells at positions D6, D7, D8, E6, E8, F6, F7, and F8, with all other wells being non-adjacent to position 116.

Figure 2:
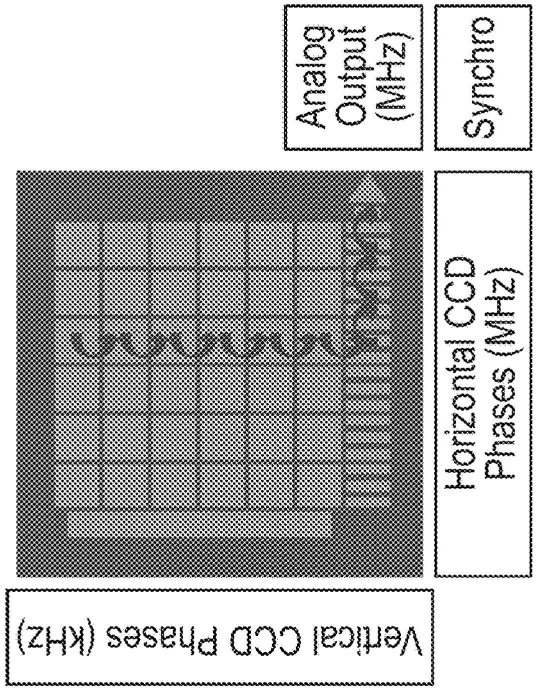
FIG. 2 (Prior Art)
FIG. 2 illustrates a prior art strategy for full frame reading of a CMOS sensor.

FIG. 2 illustrates smearing that may occur when reading a prior art full frame CCD (vertical transfer) without the use of a shutter. As previously described, frame transfer CCDs are typically not used due to their unaffordable costs and size, but may be used for specialized applications.

Figure 3A:
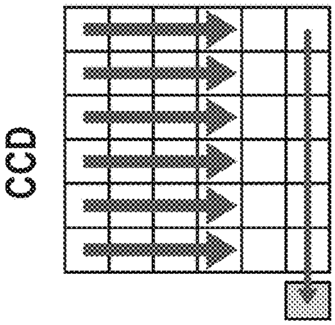
FIG. 3A illustrates readout of a 2D CCD sensor.
Figure 3B:
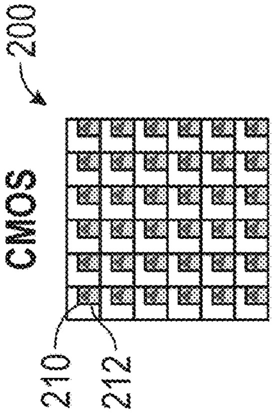
FIG. 3B illustrates readout of a shutterless 2D CMOS or scientific CMOS sensor.
Figure 3C:
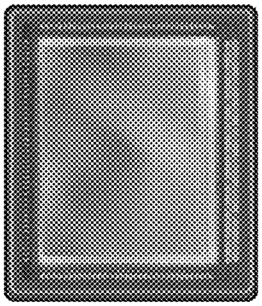
FIG. 3C illustrates a plan view of a representative 2D scientific CMOS sensor.

FIG. 3A illustrates reading of a scientific CCD sensor with a shutter (not shown) that may be used in various applications according to the present disclosure. The shutter may be closed during sensor readout to reduce or eliminate smearing. FIGS. 3B-3C illustrate a shutterless scientific CMOS (sCMOS™) sensor used in various embodiments according to this disclosure to provide fast and direct reading without smearing. As generally represented in FIG. 3B, a 2D CMOS or scientific CMOS sensor includes a 2D array 200 of pixels 210 each having associated readout circuitry 212 to provide fast and direct reading without use of a shutter and without smearing. The 2D scientific CMOS sensor allows multiple spectra readout along its height in the astigmatism-free focal plane of an imaging spectrometer as described in greater detail herein.

Figure 4:
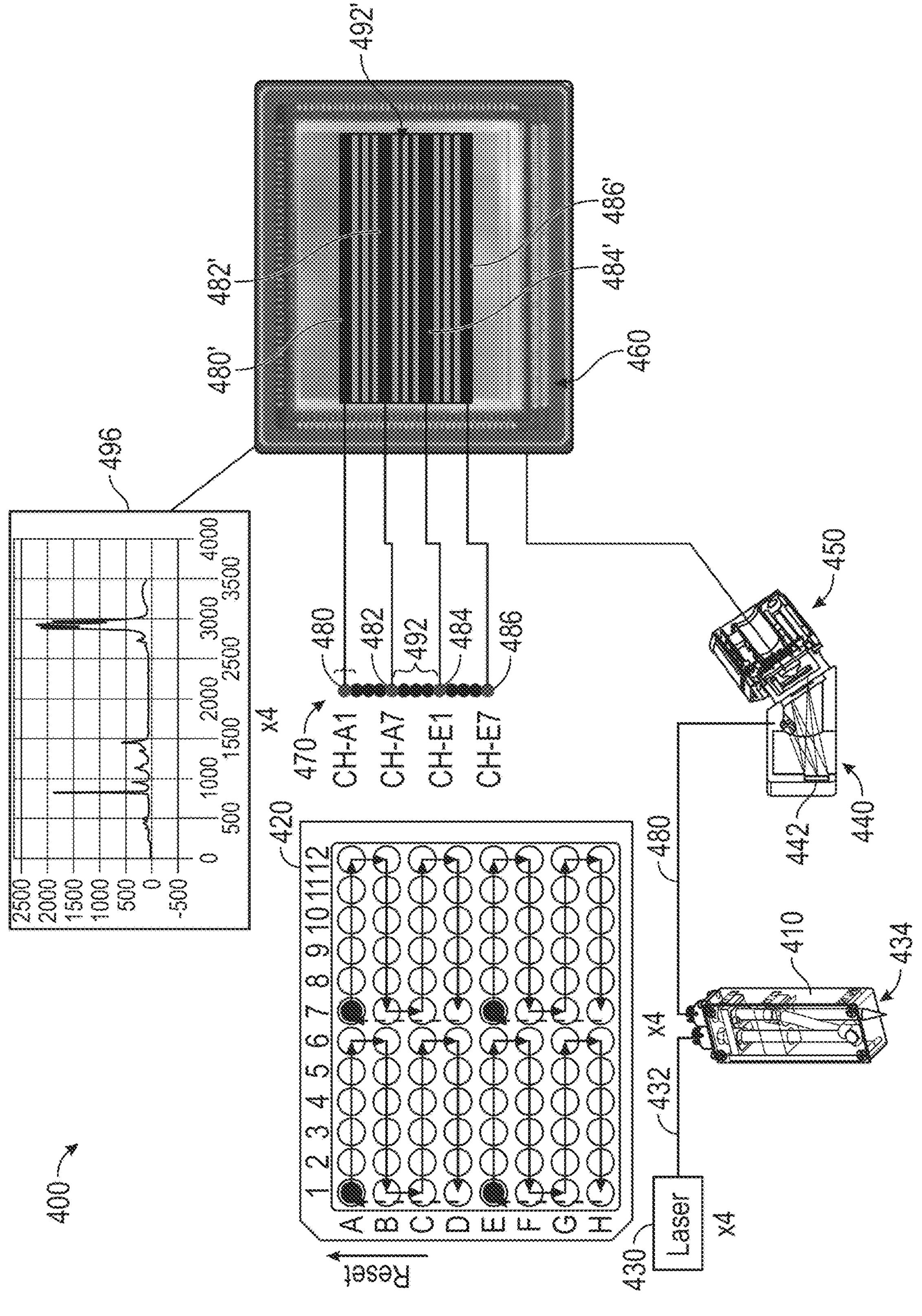
FIG. 4 illustrates components of a multi-probe Raman well plate reader.

FIG. 4 illustrates components of a representative multi-probe well plate reader 400 that includes four Raman probes 410 to provide simultaneous reading of samples contained in four non-adjacent wells with initial locations at A1, A7, E1, and E7 of a well plate 420. The quad configuration of FIG.

4 includes four fiber-coupled 532 nm, 150 mW, single mode lasers 430 and probes 410 in a fixed position relative to one another and positioned perpendicularly above the well plate 420 as designated by the solid circles. Each probe 410 is optically coupled by at least one optical fiber 432 to provide excitation light from a corresponding laser 430 perpendicular to the plane of the well plate 420 with the laser light focused within a liquid sample contained within a corresponding well extending into the plane of the drawing. In various applications, the laser light is focused just below the surface of the liquid sample to minimize the effect of laser light on the sample, as well as to minimize absorbance to improve SNR of the Raman measurements. Other applications may focus the laser light deeper within the liquid sample and/or obtain measurements from more than one depth within the sample.

The Raman signal is collected through a common (same) lens 434 as the excitation light from laser 430 with output from the probes provided by at least one corresponding optical fiber 480 associated with each probe to a single 4-channel imaging spectrometer 440 that includes a 2D imaging cooled camera 450 having a scientific CCD (combined with shutter) or a 2D CMOS sensor 460 (no shutter). As illustrated, the output light from the probes may be supplied by a linear array 470 of fibers 480, 482, 484, 486 to a single spectrometer input with spacing of at least one fiber diameter therebetween to reduce channel-to-channel crosstalk. Spacing between active fibers may be provided by one or more dead or inactive fibers 492 that do not carry light and may or may not extend partially or fully within a fiber bundle to a corresponding probe 410. Other mechanical spacers may be used in place of dead fibers. In the representative example illustrated, each active fiber 480, 482, 484, and 486 is spaced by three fiber diameters corresponding to inactive or dead fibers represented at 492. The active fibers are linearly arranged to form a line into the spectrometer and may optionally be coupled to an entrance slit (best shown in FIGS. 7A-7D). The entrance slit may be a fixed slit. In other embodiments, a slit is selected from one of a plurality of fixed slits and moved into position by an associated controller, such as by translation or rotation of a multi-slit wheel or device. Alternatively, a variable width slit may be controlled by a corresponding controller to provide a desired slit width.

Each active fiber 480, 482, 484, and 486 results in a corresponding line 480', 482', 484', and 486' on the sensor 460 with unread rows of the sensor 492' matching the inactive spacing fibers 492. The Raman signal 496 corresponds to selected binned rows of sensor pixels, which may be binned by associated software or hardware (FPGA/FW). For example, each line 480', 482', 484', and 486' may correspond to multiple rows of sensor pixels. Readings associated with a particular line or channel are binned or grouped together to generate the corresponding Raman spectrum 496 to simultaneously acquire the Raman data to generate the corresponding four Raman spectra. After acquiring the Raman measurements for samples in wells A1, A7, E1, and E7, at least one controller controls an associated mechanical positioning mechanism, such as a 2D or 3D stage having a plate holder holding well plate 420 to the next position to simultaneously acquire data from samples in wells A2, A8, E2, and E8. This process is repeated as indicated by the representative scan pattern to acquire data for all samples contained in well plate 420. A reset or home signal returns the well plate 420 to the initial position indicated. As previously described, the relative position between well plate 420 and Raman probes 410 may be controlled by one or more controllers by moving probes 410, well plate 420, or both.

The spectrometer 440 may be implemented by a near 1:1 imaging spectrometer that includes a reflective concave aberration-corrected holographic grating 442, or various other concentric spectrometer configurations (Dyson, Offner, toroid-based, Schmidt-Czerny-Turner, grating-imaging spectrometer, etc.) all featuring low to no astigmatism. The number of fiber channels for such a multi-track configuration is limited by aberrations of the spectrometer (affecting crosstalk and resolution) and the height of the sensor 460 of the cooled camera 450. In addition, the number of fiber channels is also limited by the size of the physical array of probes that can fit on top or bottom of the well plate and by the desired cost of the system.

Figure 5:
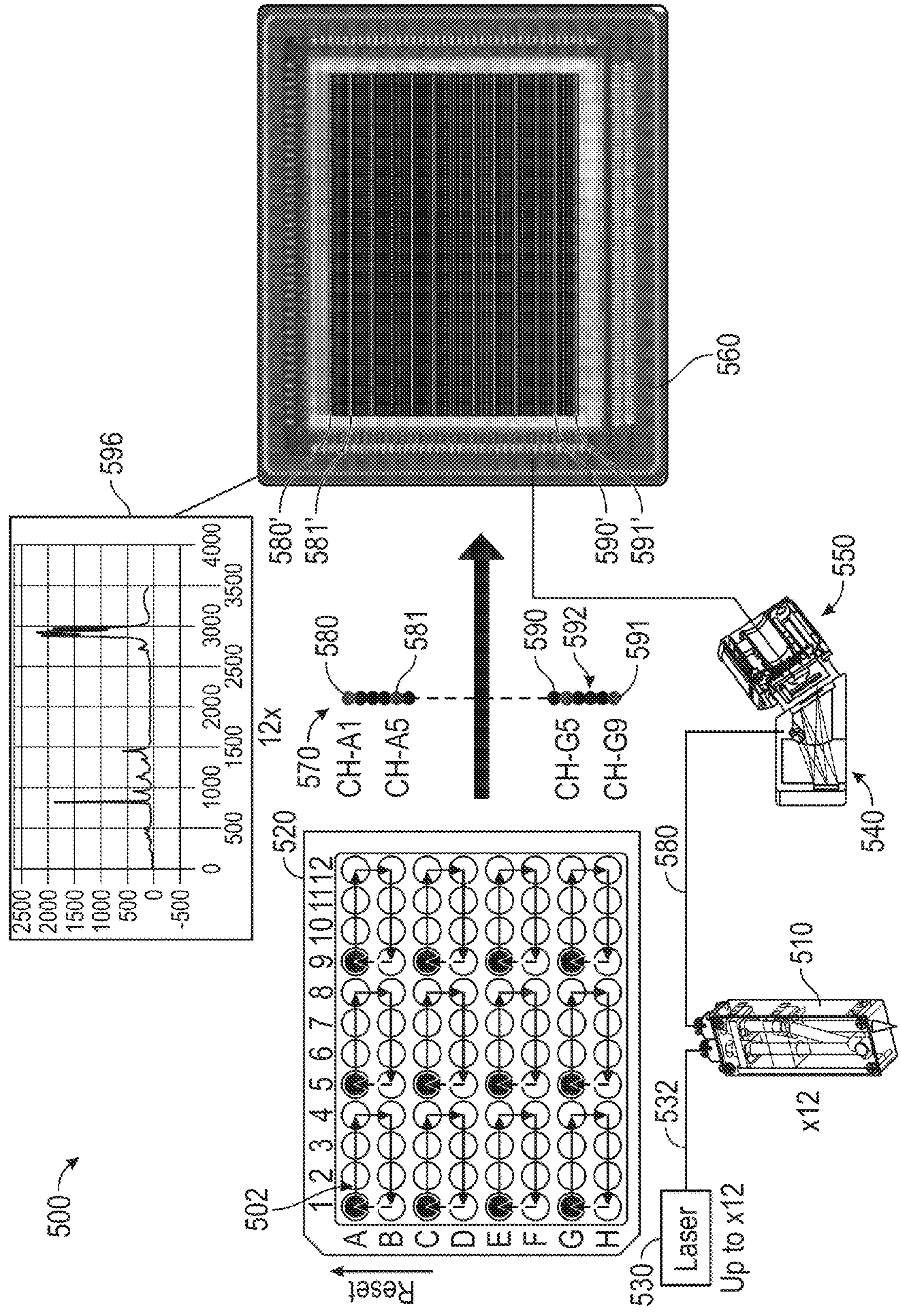
FIG. 5 illustrates components of another embodiment of a multi-probe Raman well plate reader.

FIG. 5 illustrates a representative embodiment 500 similar to the embodiment illustrated and described with respect to FIG. 4, but including twelve Raman probes 510 for simultaneous data acquisition from liquid samples contained with corresponding wells of a well plate 520 having 96 wells. The system may include 12 lasers 530 (pig-tailed, for example) coupled by optical fibers 532 to probes 510. Alternatively, fewer lasers may be used with each laser having an associated splitter to deliver the excitation beam to two or more probes 510. In this embodiment, 12 non-adjacent probes 510 are arranged perpendicular to the plane of the well plate 520 to read associated spaced wells, which are spaced from one another in each direction by at least one well that does not receive focused laser light from the probe 510 during the current measurement.

A representative scanning pattern 502 is shown so that each of the twelve probes 510 acquires Raman data from one of six wells of the well plate during each measurement cycle. For example, in the initial position illustrated in FIG. 5, the measurements for samples contained within wells A1, A5, A9, C1, C5, C9, E1, E5, E9, G1, G5, and G9 are obtained simultaneously. After each measurement, the relative position between the probes and the well plate is changed by moving the well plate, moving the probes, or redirecting the excitation light from the probes. In one example, after obtaining simultaneous measurements from the first subset of wells, at least one controller operates at least one mechanical positioning mechanism to change relative position between the well plate 520 and probes 534 with the measurements acquired simultaneously from the next subset of twelve wells corresponding to wells A2, A6, A10, C2, C6, C10, E2, E6, E10, G2, G6, and G10 in this example. The process is repeated until measurements are acquired from samples in all wells of the well plate 520. Of course, the positioning/arrangement of probes 510 as well as the reading or scanning pattern 502 may vary by application and implementation.

The example of FIG. 5 is similar to the example of FIG. 4 with the outputs of probes 510 optically coupled by corresponding optical fibers (which may include one or more fibers per probe) to a multi-channel spectrometer 540 having an imaging camera 550 with a 2D CCD or CMOS sensor 560. One end of the output fibers 580, 581 . . . 590, 591 from probe 510 are linearly arranged as indicated at 570 at the input of spectrometer 540 spaced from one another by at least one fiber diameter (three fiber diameters in this example). Spacing between fibers 580-591 may be provided by one or more inactive or non-functioning fibers 592. Light from each fiber forms a corresponding line 580', 581' . . . 590', 591' on 2D sensor 560. Each line may correspond to multiple rows of sensor pixels with each column of the multiple rows binned or combined together to generate a corresponding Raman spectrum 596. Each line is separated by multiple rows of unread sensor pixels corresponding to the non-functioning fibers 592' to reduce channel-to-channel crosstalk and increase SNR. The position of fibers corresponding to a particular Raman probe relative to fibers corresponding to another probe is selected for convenience and may vary by application. For example, fiber 580 could be positioned at any position within the linear arrangement rather than the top or bottom position. For applications having more than one fiber associated with the output from one probe, the fibers from each probe are grouped together and positioned adjacent one another and spaced from fibers other probes by one or more fiber diameters as illustrated and described in greater detail with respect to FIG. 7.

Figure 6:
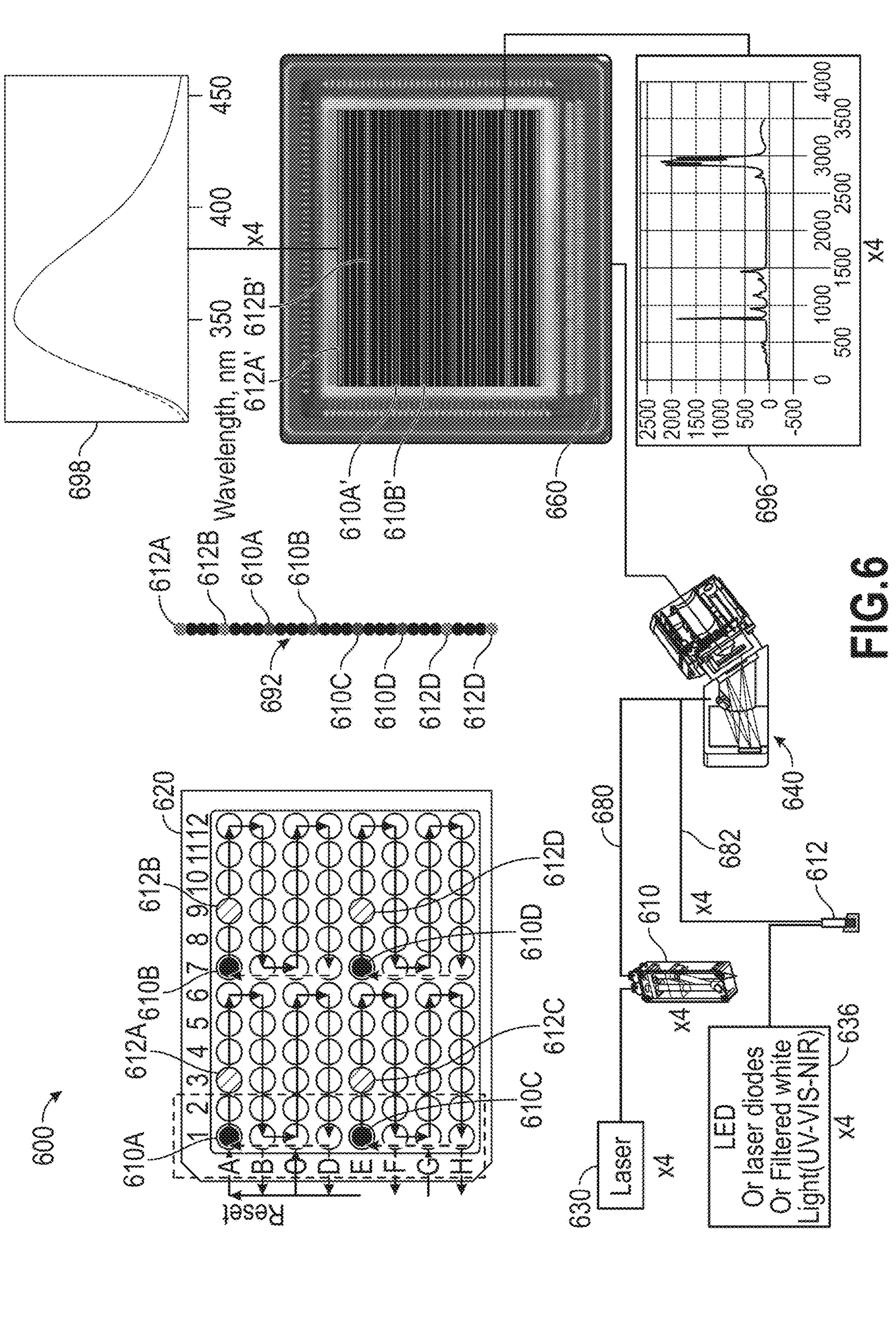
FIG. 6 illustrates a system or method for simultaneous acquisition of Raman and fluorescence data from a well plate.

FIG. 6 illustrates operation of a system or method 600 for simultaneous acquisition of Raman and fluorescence measurements from samples contained in different wells of a well plate 620. The double quad configuration of FIG. 6 includes four (4) Raman probes 610(A-D) and four (4) fluorescence probes 612(A-D) with each probe 610, 612 positioned to obtain a corresponding measurement from samples contained in different, non-adjacent wells. In this example, four (4) lasers 630 provide excitation light to corresponding Raman probes 610, i.e. each laser 630 provides excitation light to one of the Raman probes 610. Four different illumination sources 636 provide illumination of corresponding wells for fluorescence measurements. The fluorescence illumination sources 636 may be LEDs, laser diodes, or filtered white light to provide a desired wavelength for illumination (UV-VIS-NIR), for example.

The configuration illustrated in FIG. 6 requires additional positioning of the well plate 620 in the x-y plane for the fluorescence probes 612(A-D) to read wells between the initial position of the fluorescence probes (at A3, A9, E3, and E9) and the Raman probes (at A1, A7, E1, and E7) where only fluorescence measurements are obtained, but may provide an overall 75-80% gain in speed with simultaneous fluorescence and Raman measurements for the other wells. In the representative configuration illustrated, additional relative motion between the well plate and the probes is needed for the fluorescence probes 612 to scan wells in columns 1, 2, 7, and 8. Those of ordinary skill in the art will recognize similar requirements for different spacings or other orientations of the Raman probes 610 and fluorescence probes 612. As a non-limiting example, configurations may include fluorescence probes 612 that are offset in the x-y array by one or more positions in the x-axis (row) direction and/or y-axis (column) direction relative to the Raman probes 610, i.e. initial positioning of Raman probes 610(A-D) measuring wells A1, A7, E1 and E7 with fluorescence probes 612(A-D) measuring wells B2, F2, B8, and F8. Probe positioning may vary based on the requirements of the particular application and implementation.

The configuration of FIG. 6 utilizes a fiber bundle 680 connected from outputs of Raman probes 610 to the input of imaging spectrometer 640, and a fiber bundle 682 connected from outputs of fluorescence probes 612 to the input of imaging spectrometer 640. One end of the fibers 680, 682 are linearly arranged at the input of the spectrometer 640. Fibers associated with each probe (whether Raman or fluorescence) are separated by fibers associated with another probe by at least one fiber diameter 692 to reduce channel-to-channel crosstalk. Spacing between fluorescence probes may be different from spacing between Raman probes. In addition, fibers associated with the Raman probes 610(A-D) are positioned in the middle of the linear arrangement and fibers associated with the fluorescence probes 612(A-D) are positioned on either side of the Raman probe fibers because the spectral resolution along the height of the scientific CMOS sensor 660 degrades away from optical center. Stated differently, the fibers associated with the Raman probes 610 are positioned closer to center of the linear arrangement than fibers associated with the fluorescence probes 612, resulting in corresponding imaged light lines 612A', 612B', etc. being farther from the optical axis of sensor 660 than imaged light lines 610A', 610B', etc. Angles of incidence (AOIs) for the readout of fluorescence (low resolution requirement) are therefore the furthest away from the optical center of the sensor. This configuration works well for a hybrid configuration including both Raman and fluorescence probes as the resolution required for fluorescence is typically significantly less demanding than the resolution required for Raman (on the order of 5×-15× less). Similar to previously described examples, each imaged light line may correspond to multiple rows of sensor pixels that are grouped or binned by column to generate corresponding Raman spectra 696 and fluorescence spectra 698. The number of pixel rows associated with each of the imaged fluorescence lines may be different from the number of pixel rows associated with each of the imaged Raman lines. As illustrated by the example in FIG. 6, a single spectrometer having a single diffraction grating and 2D sensor may be used to simultaneously capture Raman and fluorescence measurements from samples in multiple wells.

While the present inventors have recognized that the positioning or alignment of probes over non-adjacent wells reduces well-to-well crosstalk while acquiring measurements, various applications may compromise crosstalk and SNR by acquiring fluorescence measurements from the same well as Raman measurements to achieve a desired throughput or other overall system performance.

Figures 7A, 7B, 7C, 7D:
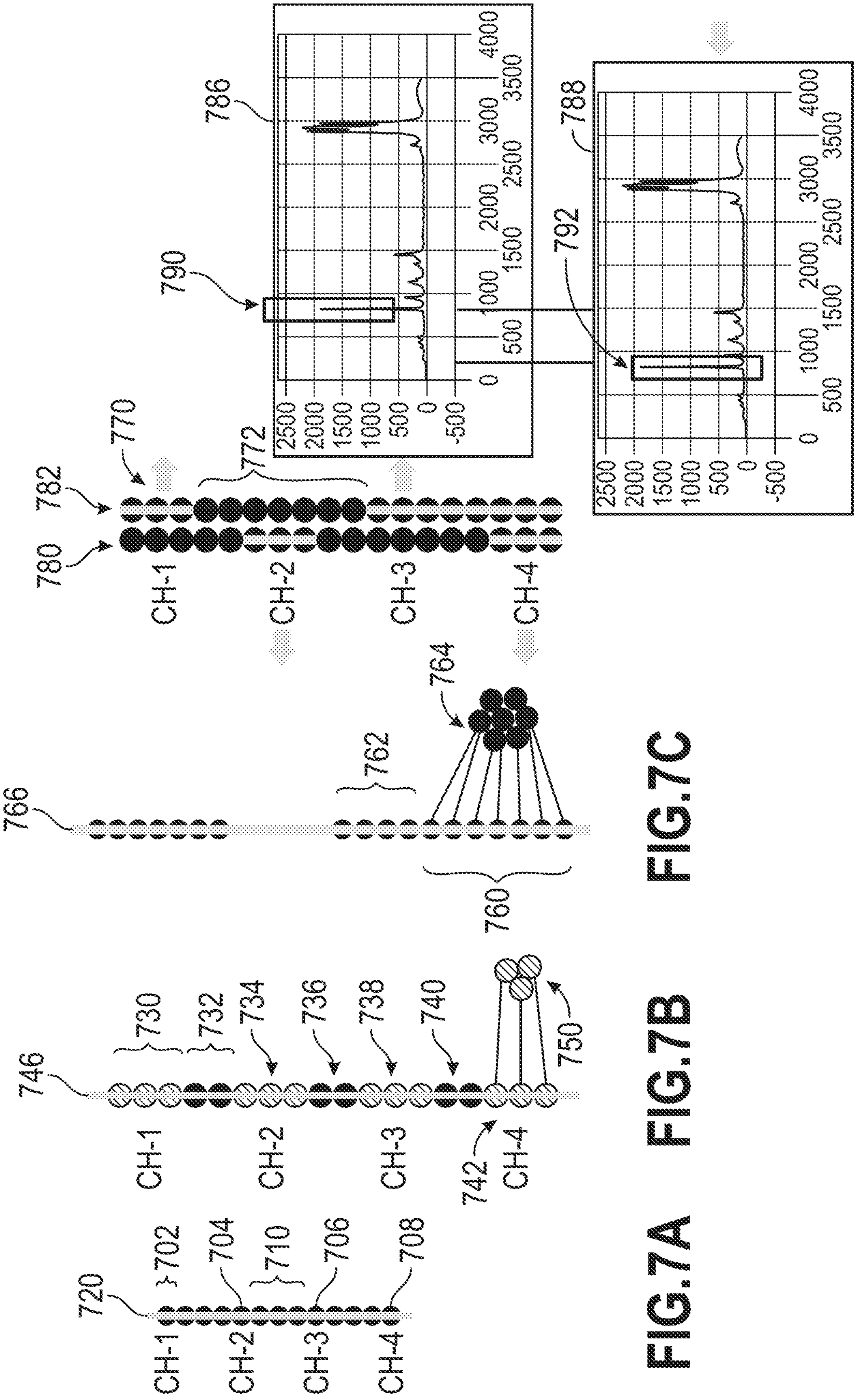
FIG. 7A illustrates linearly arranged fibers with a single active fiber per channel and an optional slit input to a spectrometer.
FIG. 7B illustrates another configuration of linearly arranged fibers with three active fibers per channel and an optional slit at a spectrometer input, with opposite ends of the fibers grouped in a triangular cluster.
FIG. 7C illustrates another configuration of linearly arranged fibers with seven active fibers per channel and an optional slit at a spectrometer input, with opposite ends of the fibers grouped in a hexagonal cluster.
FIG. 7D illustrates another configuration of dual column linearly arranged fibers with three active fibers per channel and an optional slit array at a spectrometer input, with resulting spectra laterally shifted on the spectrometer sensor.

FIGS. 7A-7D illustrate various linear arrangements for fibers that couple light emitted in response to the excitation light by the samples contained in the well plate to the input of the spectrometer. As indicated in FIG. 7A, a first configuration includes four probes with one active fiber 702, 704, 706, and 708 for each of the four channels corresponding to simultaneous acquisition from for wells. Each active fiber 702, 704, 706, and 708 is separated by multiple inactive fibers 710. As previously described, the inactive fibers are used for convenience and may be replaced by any suitable spacer. However, use of inactive fibers provides a low-cost, precision diameter that facilitates forming a linear arrangement of fibers, and positioning of such fiber arrays is common work for a fiber assembly provider. Other mechanical spacers may be used when the desired spacing distance between active fibers is not an integral multiple of the fiber diameter.

In the example of the first configuration of FIG. 7A, three inactive fibers 710 are positioned between adjacent active fibers, i.e. between fibers 702-704; 704-706; and 706-70 and positioned in a linear arrangement at the input to the spectrometer, although other configurations may include a greater or fewer number of inactive fibers or other spacer(s). An optional slit 720 may be used to provide a desired spectral resolution for any of the configurations illustrated. As previously described, slit 720 may be a fixed width, may be selected by a controller from a plurality of slits having different widths, or may be a variable width slit controlled by an associated controller. The number of inactive spacing fibers may be selected to reduce crosstalk below a desired threshold for a particular selected imaging spectrometer, with more spacing between fibers generally corresponding to lower channel-to-channel crosstalk.

FIG. 7B illustrates an example of two or more active fibers per well/channel separated by one or more inactive fibers. In the representative example illustrated, three active fibers 730, 734, 738, 742 are provided for corresponding channels 1-4 with two inactive fibers 732, 736, 740 separating each group or set of three active fibers. The active fibers 742 are arranged in a triangular cluster 750 at one end to capture the Raman output signal, and in a linear array at the opposite end at the input to the spectrometer. An optional slit 746 may be provided as previously described.

FIG. 7C includes seven active fibers 760 per channel with four inactive fibers 762 separating each active fiber group with the fibers linearly arranged at the input to the spectrometer. The active fibers 760 are arranged in a cluster 764 at one end to capture the Raman output signal from the probe, and in a linear array at the opposite end of the fibers that are linearly arranged with additional inactive fibers 762 or a similar spacer at the input to the spectrometer. An optional slit 766 may be provided as previously described.

FIG. 7D includes three active fibers 770 for each channel separated by one or more inactive fibers 772. The fibers are arranged in two parallel columns 780, 782 at the input to the spectrometer and may be used either without a slit, or optionally with a patterned slit or slit array as illustrated. This results in the spectra being shifted on the 2D sensor, as represented by spectrum 786 relative to spectrum 788 but has the advantage that strong peaks such as represented at 790 and 792 that may otherwise be aligned and could overlap on the same sensor pixels do not cross-contaminate each other.

Figure 8:
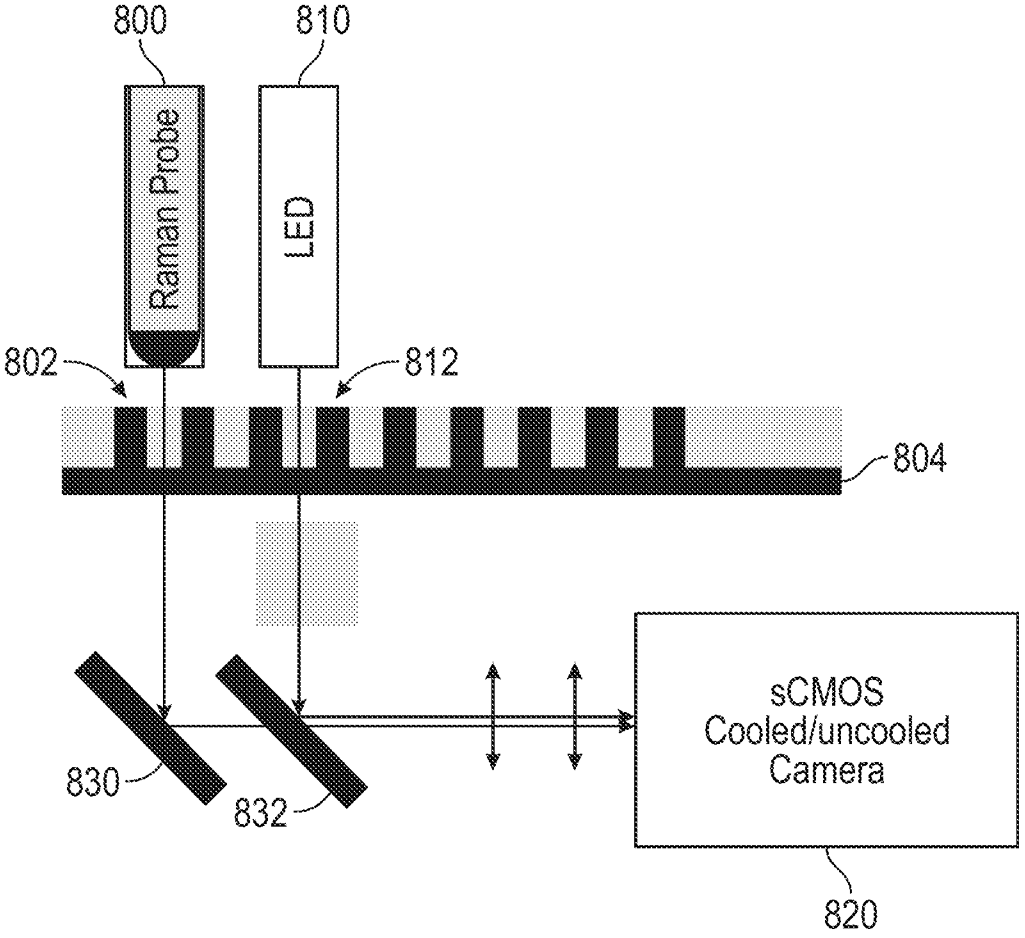
FIG. 8 is a simplified diagram illustrating a well plate reader having combined Ram and whole well imaging.

As previously described, the high throughput well plate reader may combine Raman with other types of measurements. The fiber arrangements illustrated in FIGS. 7A-7D may be used to couple various types of probes to a respective spectrometer. For example, applications having fluorescence probes may use any of the fiber arrangements illustrated for the fluorescence probes in combination with Raman probes as previously described. The number of fibers per fluorescence channel may vary from the number of fibers FIG. 8 is a simplified diagram illustrating a well plate reader having combined Raman and whole well imaging. As illustrated, a Raman probe 800 is used to read one well 802 of well plate 804 while an LED 810 or filtered broadband source is used to simultaneously read a second non-adjacent well 812. The light from the probes is directed respectively by a first mirror 830 and a second dichroic mirror or beam splitter 832 to a camera 820 having a 2D scientific CMOS sensor, which may be cooled or uncooled, to provide whole well imaging. As illustrated in the example of FIG. 8, Raman probe 800 illuminates a liquid sample in a corresponding well 802 from one side of well plate 804 (the top side in this example), with light emitted by or transmitted through the sample collected from an opposite side of well plate 804 (the bottom side in this example). Similarly, an additional source, such as LED 810 illuminates non-adjacent well 812 from the top of well plate 804 with emitted and transmitted light collected from the bottom of well plate 804. Optical fibers may be used to deliver the illuminating light from one or both probes to the associated wells 802, 812, and/or to collect light and deliver collected light to camera 820 depending on the particular application and implementation.

Figure 9A:
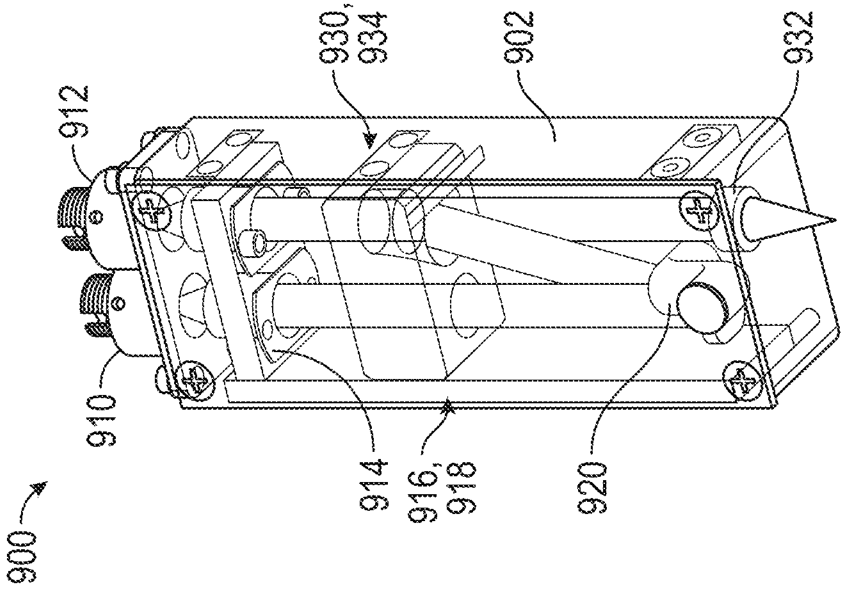
FIG. 9A is a perspective view illustrating components within a representative Raman probe including input and output fiber connectors.
Figure 9B:
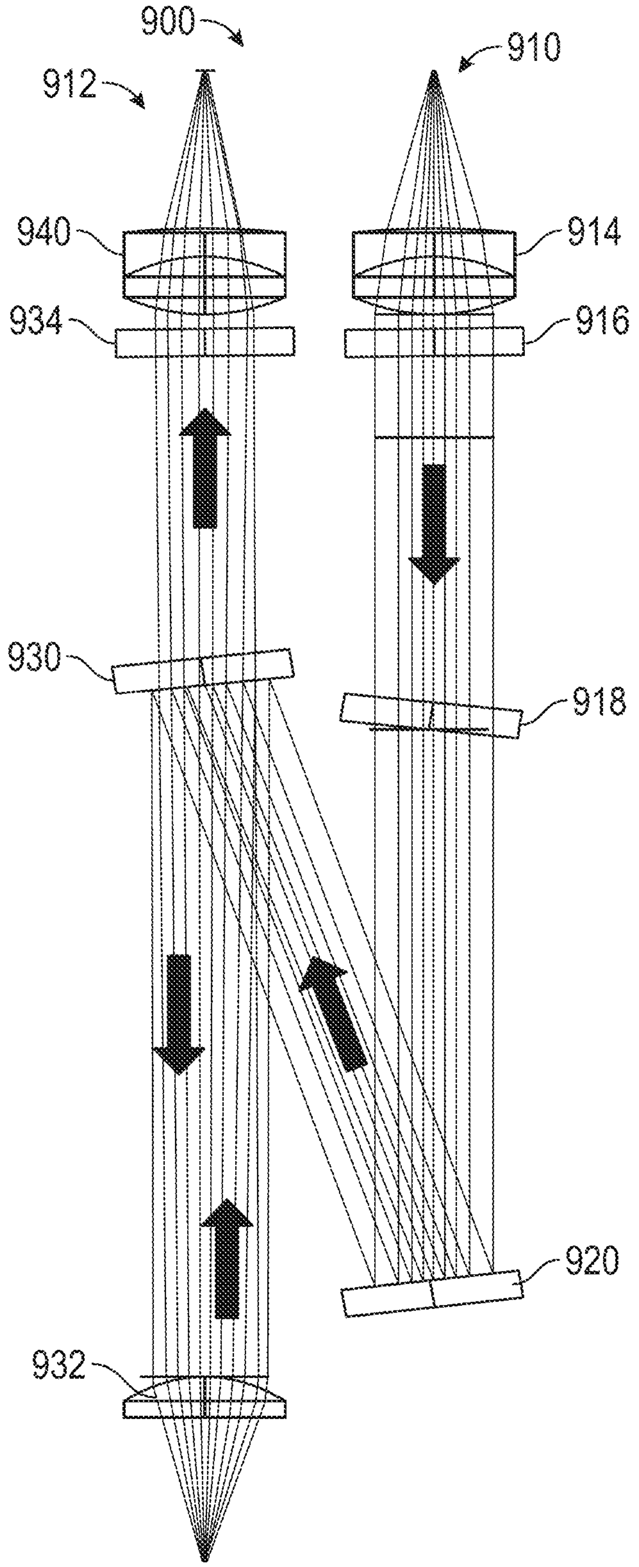
FIG. 9B is an optical layout for the representative probe of FIG. 9A.

FIGS. 9A and 9B illustrate components of a representative Raman probe 900 including an input fiber connector 910 and output fiber connector 912. The input 910 is connected to a laser source (not shown). The probe 900 may be positioned either above the well plate or below the well plate depending on the particular application and implementation as previously described. Likewise, in some applications the illumination/exposure components configured to deliver laser light to the sample may be separated from components used to collect light emitted by or transmitted through the sample as previously described.

In the example illustrated in FIGS. 9A and 9B, the various optical components are contained within a housing 902 (shown with cover removed in FIG. 9A). Light from the laser source passes through input 910 through an achromat collimating lens 914 and one or more optional bandpass filters 916, 918 to mirror 920. Bandpass filter may be positioned at an angle relative to the optical axis of bandpass filter 916 to reduce or eliminate back reflection of laser light to the laser input that could otherwise have a destabilizing effect on the laser. The laser light is reflected by the mirror 920 to a dichroic longpass filter 930, which reflects the wavelength of laser light to the plano-convex sample lens 932 that focuses the light within a liquid sample contained within a respective well. Light emitted by the liquid sample is collected by the same plano-convex sample lens 932 and directed to the dichroic longpass filter 930 that passes the light (containing shifted wavelengths relative to the reflected laser light) to a second dichroic longpass filter 934 (or notch filter), which in turn passes filtered light to an achromat collection lens 940 that focuses the light on one or more optical fibers coupled to the output 912. The optical fiber(s) couple the Raman signal light from each probe to the input of an associated spectrometer (not shown). Various fiber arrangements may be used to collect the signal light and to couple the Raman probe to the spectrometer input such as those illustrated and described with reference to FIGS. 7A-7D. Other Raman probe configurations may be used as known by those of ordinary skill in the art. For example, an immersion probe may be used that is immersed in the sample contained within a well being measured, but may require self-cleaning between measurements to avoid cross-contamination of samples.

Figure 10:
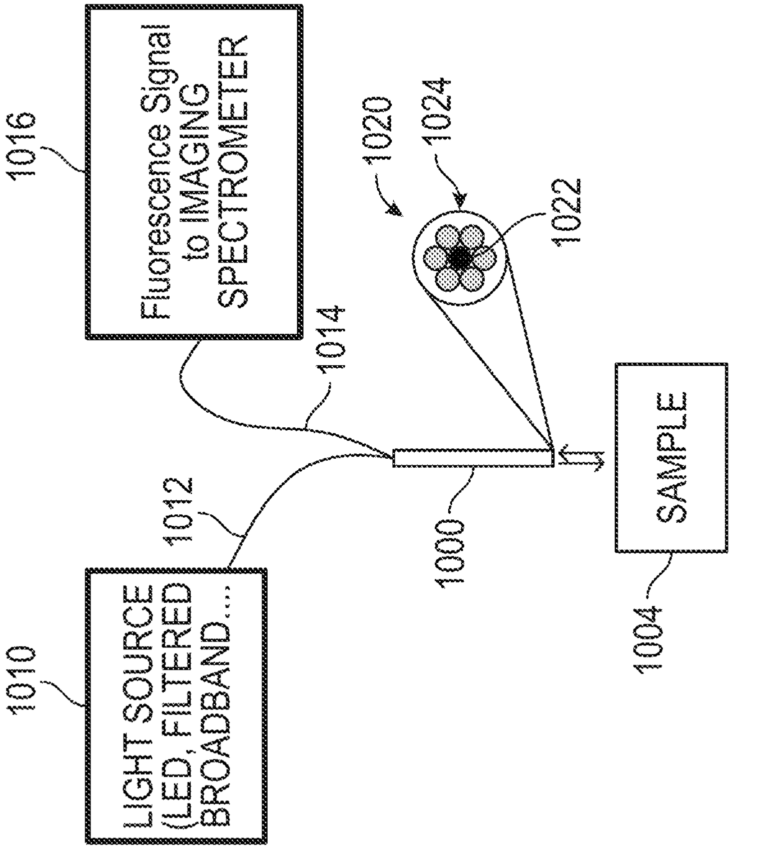
FIG. 10 illustrates a representative fluorescence probe.

FIG. 10 illustrates a representative fluorescence probe 1000. A light source 1010 (such as an LED, filtered broadband, etc.) is coupled by a fiber bundle 1012 to the conduit of the probe 1010 and illuminates a liquid sample 1004 contained in one of the wells of the well plate either from above or below depending on the particular application and implementation. The fluorescence light emitted by the liquid sample is then coupled by one or more fibers 1014 to the input of an associated imaging spectrometer 1016 in a linear arrangement with one or more other fluorescence and/or Raman probes as previously described. The optical fibers at the tip 1020 of the probe 1000 may be arranged in a cluster having at least one central illumination fiber 1022 coupled to fiber bundle 1012 and light source 1010 surrounded by a group of collection fibers of fiber bundle 1014 coupled to spectrometer 1016, or vice versa. Fluorescence probes 1000 may by configured as remote sensing (as illustrated) or immersion/dip probes. One or more fibers within the probe may be angled relative to the sample surface to reduce back-scattering of the illumination light.

Figure 12:
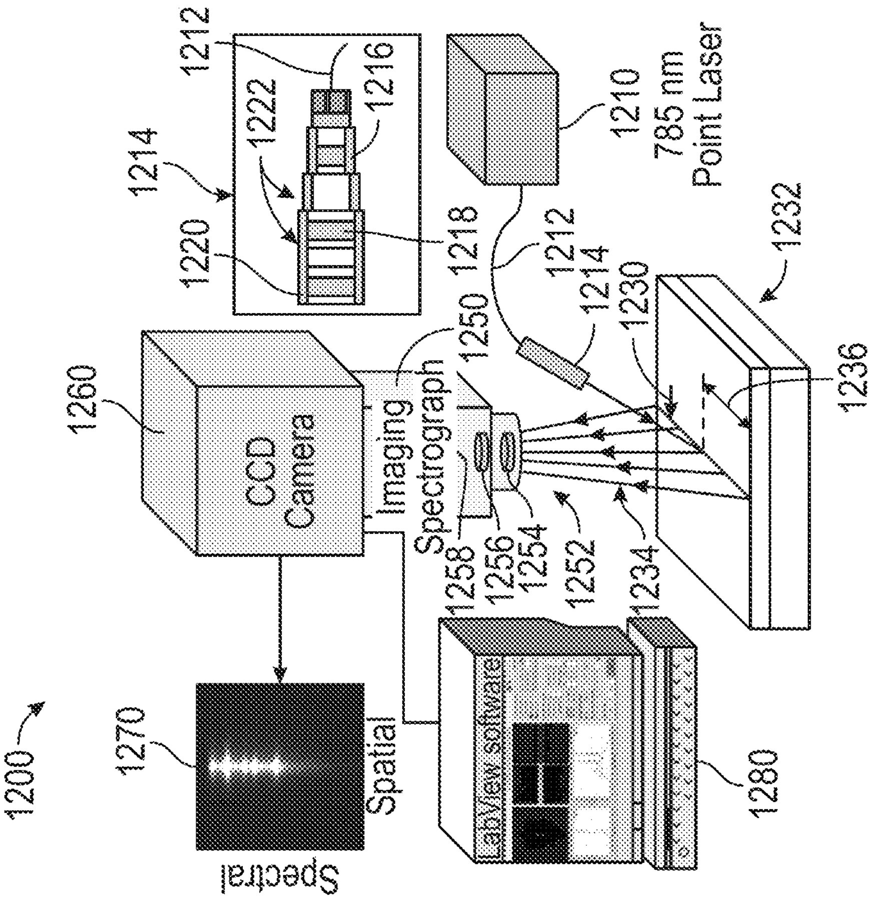
FIG. 12 illustrates a SORS system that may be used to acquire simultaneous Raman measurements from multiple wells of a well plate according to the disclosure.
Figure 11:
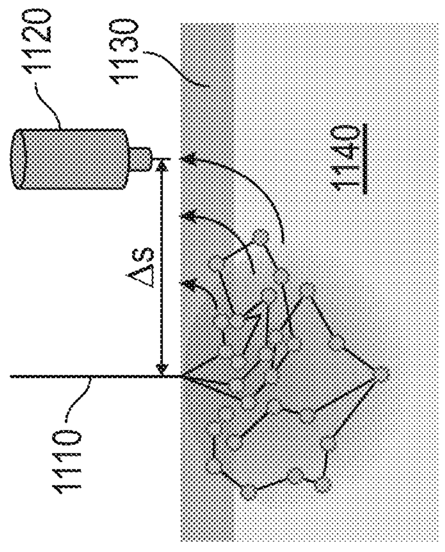
FIG. 11 illustrates a representative configuration for spatially offset Raman spectroscopy (SORS).

FIGS. 11 and 12 illustrate representative configurations for a spatially offset Raman spectroscopy (SORS) implementation for a well plate reader according to the disclosure. A SORS configuration may be used to eliminate background from the well plate material (bottom, side, etc.) as well as any contribution from a lid/cover that may be applied to the well plate. SORS allows probing the liquid sample at different levels within the well of the well plate. FIG. 11 illustrates relative positioning of the excitation laser beam 1110 and a collection probe 1120 positioned above the well and spatially offset by a distance Δs. The SORS implementation may be used to obtain measurements within an upper layer 1130 and/or a lower layer 1140 of the liquid sample. Alternatively, the upper layer 1130 may correspond to a well plate cover with the measurements obtained only below the well plate cover within a selected depth of the liquid sample.

FIG. 12 illustrates a configuration that may be used for a line scan to determine a desired spatial offset. Use of an imaging spectrometer having a large number of pixels in the vertical (spatial) axis facilitates a line scan configuration, which may be particularly suited for applications that include a well plate cover/lid placed on top of the wells, or in configurations where the Raman signal is obtained through the bottom of the well, for example. SORS system 1200, includes a laser 1210 coupled by an optical fiber to a laser focus unit 1214. The laser focus unit 1214 may include a collimating lens 1216, a laser line filter 1218, and a focusing lens 1220 with associated adapters 1222. Laser focus unit 1214 is positioned at an angle above the well plate and offset from the collection optics. Laser focus unit 1214 generates a scanning line 1230 on or within a well plate sample 1232. Raman signals 1234 emitted by the sample at various spatial offsets 1236 from the center of the scanning line 1230 are directed to an imaging spectrograph 1250. One or more optical elements, such as a lens 1252, longpass filters 1252, 1254 and input slit 1256 may be used to provide the Raman signals 1234 to the spectrometer input to generate a scattering image 1270 for subsurface evaluation with associated signals/data provided to one or more controllers, such as computer 1280.

Figure 13:
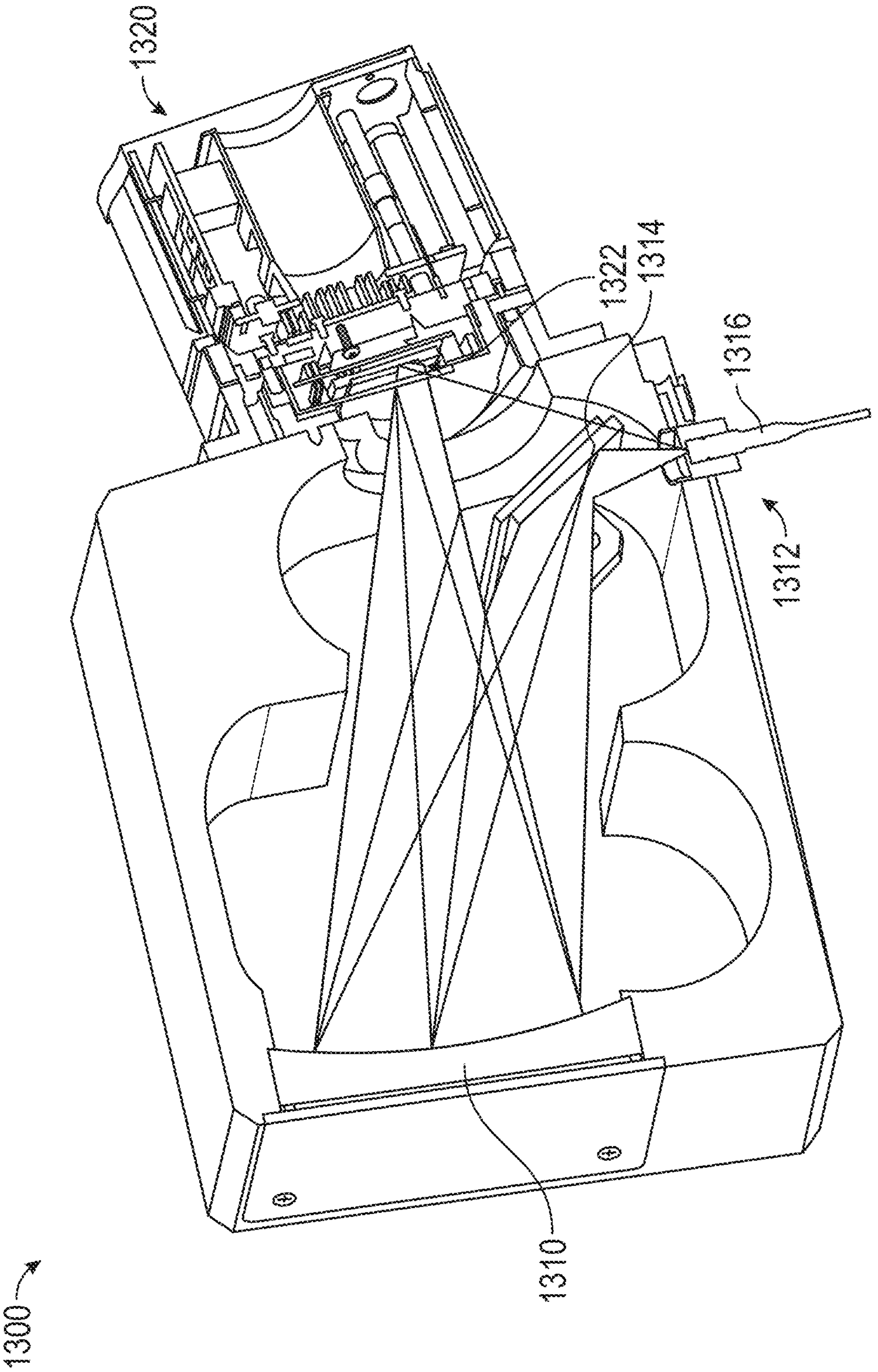
FIG. 13 illustrates a representative imaging spectrometer for use in a well plate reader according to the disclosure.

FIG. 13 illustrates a representative spectrometer for use in a well plate reader according to the disclosure. The spectrometer 1300 includes a reflective concave aberration corrected holographic grating (ACHG) 1310 and a camera 1320 having a cooled 2D sensor 1322. The camera may be implemented by the Sylent-Blue scientific CMOS camera available from HORIBA Instruments Incorporated, which includes a scientific CMOS sensor having 2048×2048 active pixels with an active photosensitive area of 22.528 mm by 22.528 mm and may include a peltier-cooled vacuum head, or alternatively, nitrogen back-filled scientific CMOS sensor purged with argon. Imaging spectrometer 1300 includes a fiber optic input 1312 that may accommodate a plurality of linearly arranged fibers from associated probes with an optional slit as previously described. Light from two or more coupled fiber probes 1316 is reflected by mirror 1314 to diffraction grating 1310, which images the diffracted light from the two or more probes on 2D sensor 1322 of camera 1320 to simultaneously acquire multiple Raman spectra from samples within associated wells of the well plate. Imaging spectrometer 1300 and camera 1320 may communicate with one or more controllers or computers (not shown) to acquire associated data from sensor 1322 and control various features of the spectrometer 1300 (such as a selectable or variable slit) and camera 1320.

Figure 14B:
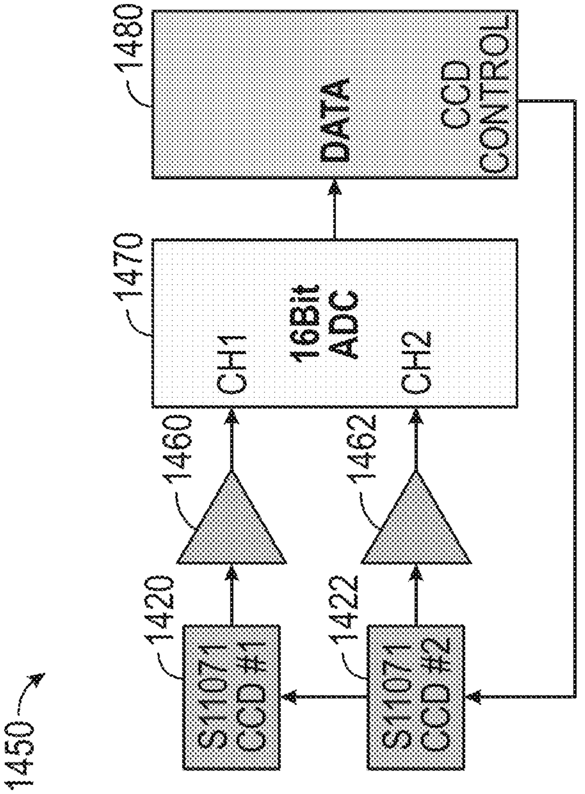
FIG. 14B is a simplified functional block diagram illustrating sensor control of a non-imaging spectrometer with a shared CCD sensor.
Figure 14A:
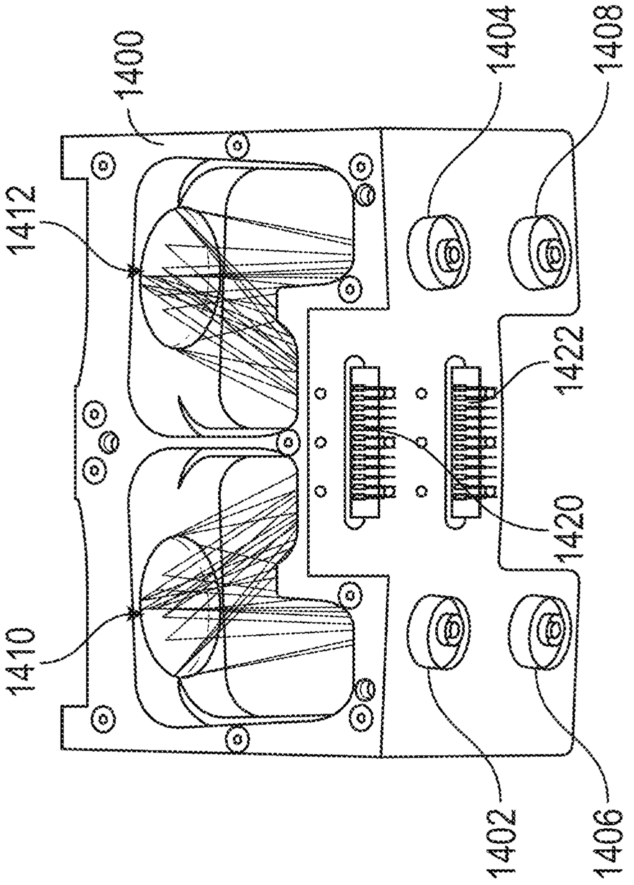
FIG. 14A illustrates a representative non-imaging spectrometer with a shared CCD sensor for use in a well plate reader according to the disclosure.
Figure 14C:
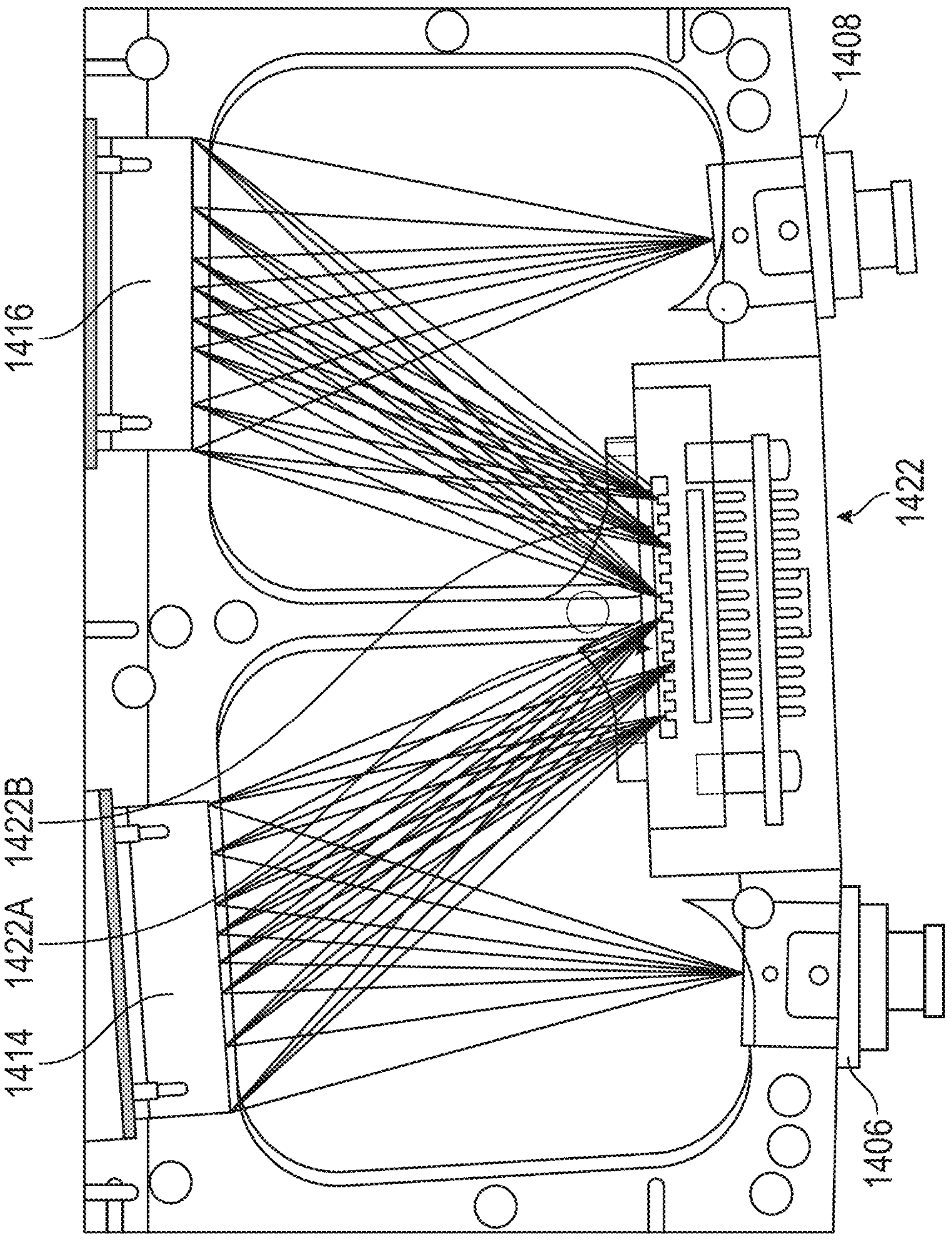
FIG. 14C is a cutaway view illustrating bottom left/right optical chambers of a non-imaging spectrometer with a shared CCD sensor.

FIGS. 14A-14C illustrate a representative non-imaging spectrometer 1400 for use in a well plate reader according to the disclosure. The non-imaging spectrometer 1400 may be implemented by the PoliSpectra® Quad multichannel grating spectrometer available from Horiba Instruments Incorporated, for example. The PoliSpectra® Quad spectrometer integrates four VS70 spectrometers each having a flat-field aberration-corrected holographic concave grating. This high throughput spectrometer 1400 includes 4 fiber inputs 1402, 1404, 1406, 1408, four concave aberration corrected gratings 1410, 1412, 1414, 1416, and two non-imaging, linear CCD sensors 1420, 1422 to provide simultaneous acquisition of 4 channels at high speed with minimal crosstalk. Spectrometer 1400 includes four optical chambers each including an associated fiber input and grating. Light from top fiber inputs 1402, 1404 is directed to corresponding gratings 1410, 1412 and then to an associated portion of shared linear CCD sensor 1420. Similarly, as best illustrated in FIG. 14C, light from bottom fiber inputs 1406, 1408 is directed to respective gratings 1414, 1416 with light from each grating 1414, 1416 directed to corresponding portions 1422A, 1422B of shared linear CCD sensor 1422.

As illustrated in the simplified functional block diagram of FIG. 14B, the main electronics board 1450 is designed to simultaneously read linear CCD sensors 1420, 1422 and provides 1-8× binning capability to simultaneously acquire data from all four channels. Signals from CCD sensors 1420 and 1422 provided to analog conditioning circuitry 1460, 1462, respectively. The conditioned sensor signals are provided to respective channels of a 16-bit analog-to-digital converter (ADC) 1470 with the resulting digital data captured in temporary computer readable storage 1480 for subsequent reading, analysis, and storage by one or more connected controllers or computers (not shown).

Figure 15:
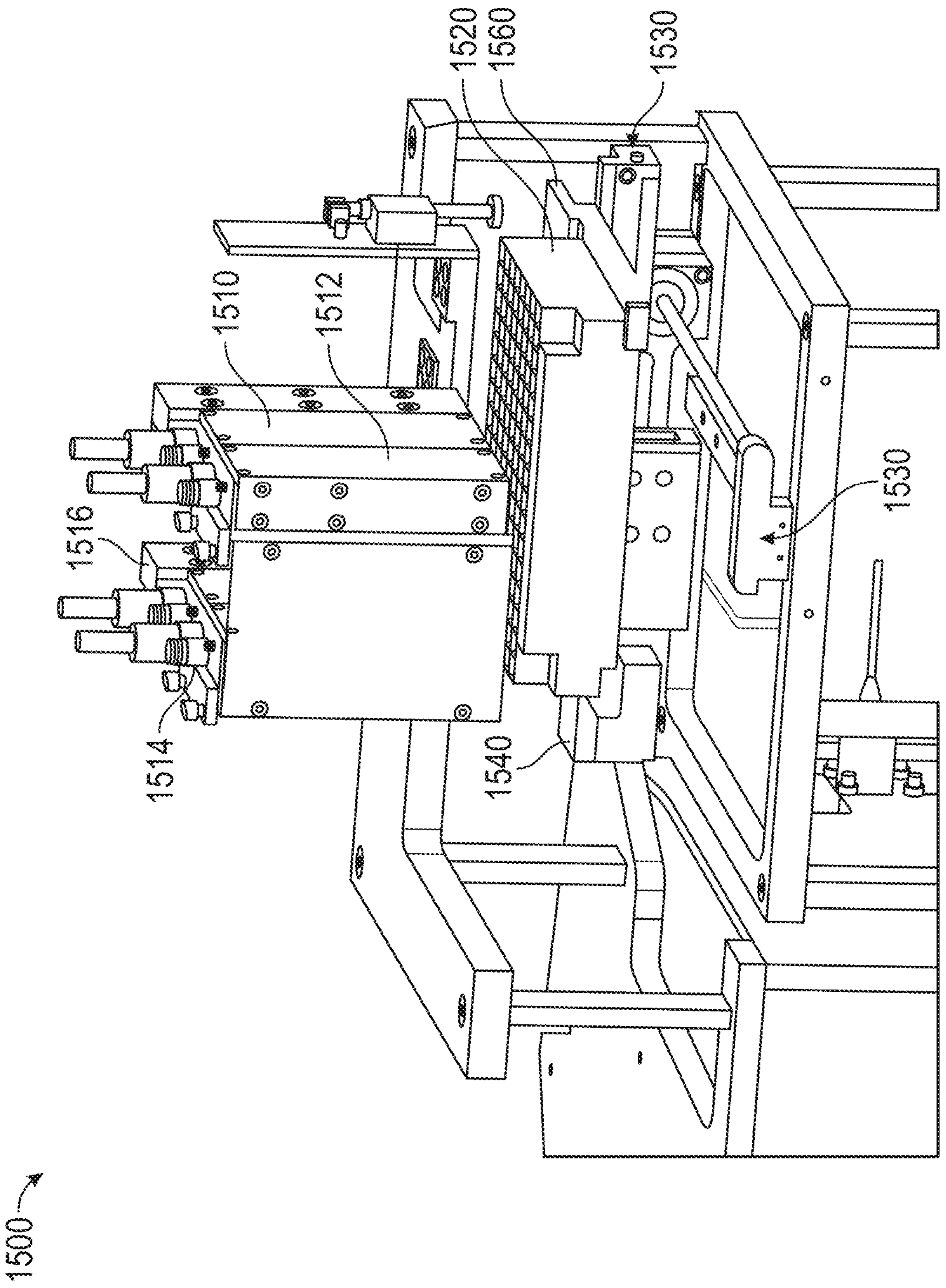
FIG. 15 is a partial perspective view illustrating various components of a representative well plate reader.

FIG. 15 is a partial perspective view illustrating various components of a representative well plate reader. In this example, system subassembly 1500 includes Raman probes 1510, 1512, 1514, 1516 fixed relative to one another and aligned with corresponding non-adjacent wells of a well plate 1520. A mechanical positioning mechanism 1530 is positionable by control of a plurality of motors 1540 to control positioning of an associated well plate holder 1560 in orthogonal X, Y, and Z directions in response to corresponding control signals from at least one controller. As previously described, the at least one controller may control positioning of the well plate 1520 relative to the focused laser light from Raman probes 1510, 1512, 1514, 1516 to simultaneously acquire Raman spectroscopy data from different samples contained in corresponding wells of well plate 1520. In some configurations, positioning mechanism 1530 is controlled during acquisition of Raman measurements to change the relative position between the well plate 1520 and Raman probes 1510, 1512, 1514, 1516 in at least one of the X, Y, and Z directions while maintaining the focused laser light from each probe within its associated well to mix the liquid sample and/or obtain data from multiple points within the liquid sample. The positioning mechanism 1530 is then controlled to align previously unexamined wells of the well plate with the probes in a predetermined pattern as previously described.

Figure 16:
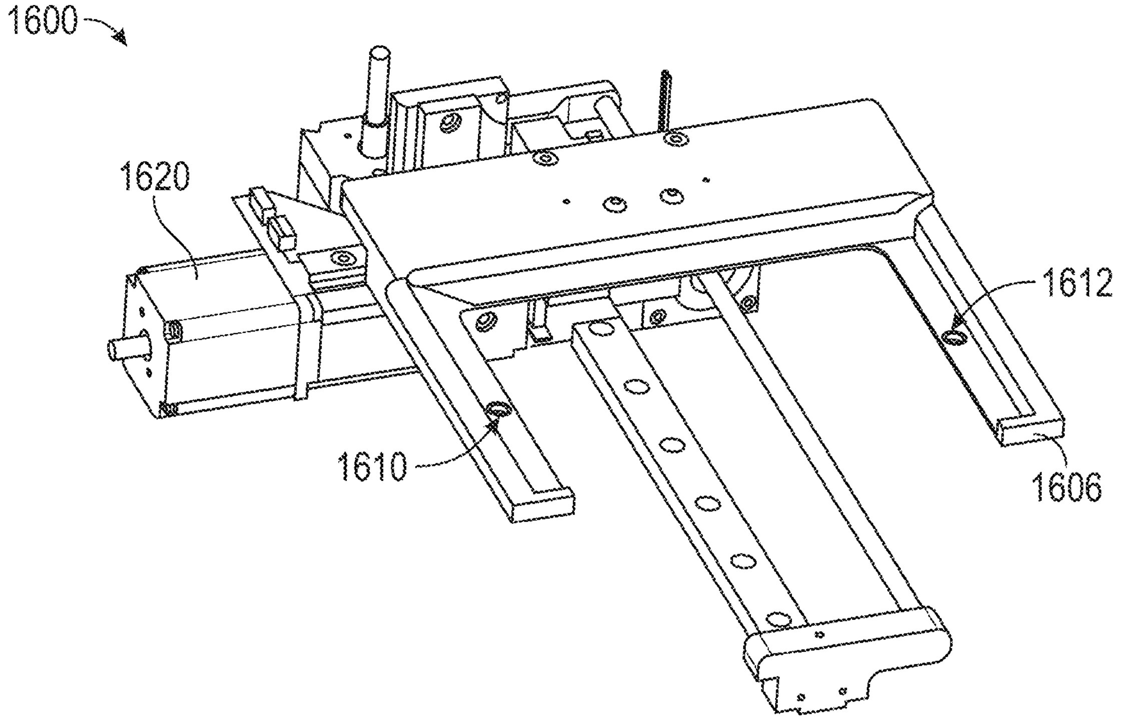
FIG. 16 illustrates a representative positioning mechanism having a well plate holder with an integrated calibration standard sample according to the disclosure.

FIG. 16 illustrates a representative positioning mechanism 1600 having a well plate holder 1606 with at least one integrated calibration standard sample 1610, 1612 according to the disclosure. Positioning mechanism 1600 includes at least one motor 1620 to move well plate holder 1606 in at least two orthogonal directions, and optionally a third orthogonal direction. One or more associated controllers may control positioning mechanism 1600 to periodically align integrated calibration standard samples 1610, 1612 with corresponding probes positioned above or below the well plate holder 1606 during a calibration process. Measurements obtained by the system from the calibration standards may be compared to previously established and stored Raman data for the material of the standard. Detected deviations in peak wavelengths or intensity may be used to adjust the wavelength/intensity of a corresponding laser or other light source associated with the probe. The number and material of standard samples may vary based on the number and type of probes being calibrated, in addition to the maximum available travel of the positioning mechanism to position the probes relative to the standards and the specified time to complete calibration of all probes. Different standard samples may be provided for different types of probes, and/or to calibrate probes for a desired specified wavelength. In one representative example, diamond calibration samples 1610, 1612 are fitted into corresponding arms/legs of the well plate holder 1606, with each of the diamond calibration samples used during calibration of two probes.

One or more controllers of a representative well plate reader system may be programmed to automatically calibrate probes on a periodic basis, such as once/day, for example. The controller(s) may be programmed to align an associated calibration standard with a probe, collect measurement data, compare the measurement data to previously stored data for the standard material, and control a corresponding light source wavelength and/or intensity based on the comparison. For example, when the calibration process detects wavelength (X-axis) drift between the measured calibration sample material and known sample material spectrum for one or more peak wavelengths, the controller will automatically correct for this drift by shifting the wavelength of the laser to reduce the difference between the measured peak wavelength with the standard peak wavelength for the material. Similarly, the calibration process may detect intensity drift and may adjust the light source intensity accordingly. Alternatively, the system may suggest a different calibration process using a calibration plate with multiple standard samples that is held by the well plate holder 1606. The calibration plate may be used to calibrate intensity of various light sources relative to one another for throughput matching across different probes.

Figure 17:
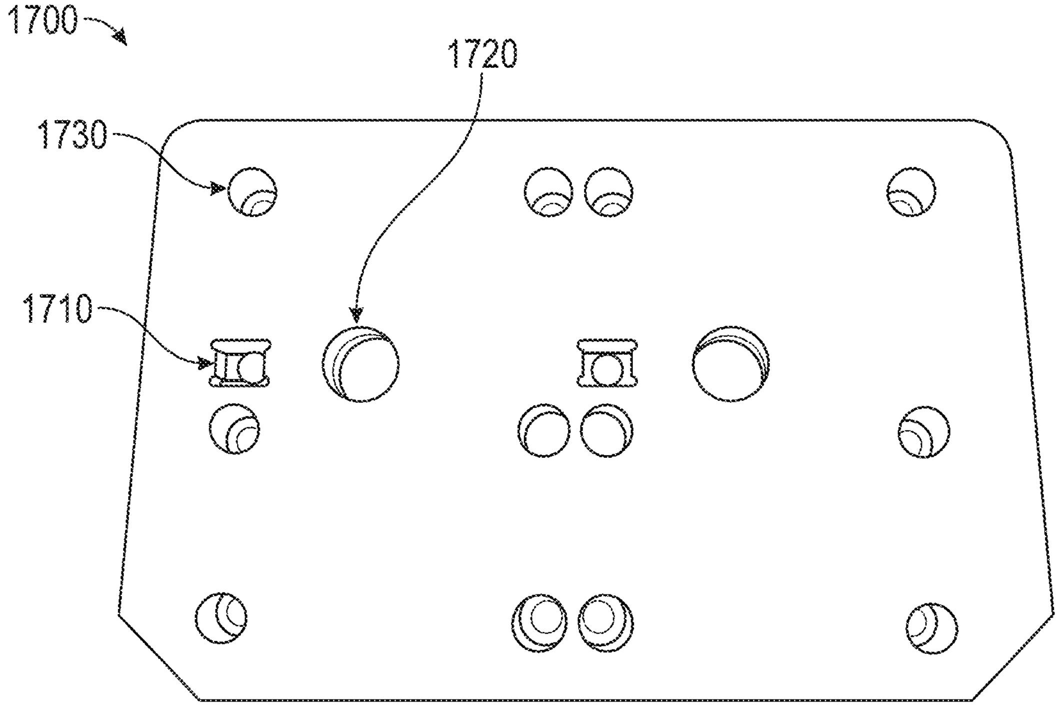
FIG. 17 illustrates a representative calibration plate having calibration standard samples for one or more probes of a well plate reader according to the disclosure.

FIG. 17 illustrates a representative calibration well plate 1700 having at least one calibration standard sample for one or more probes of a well plate reader according to the disclosure. Calibration well plate 1700 is sized based on a corresponding well plate that may be secured in a well plate holder of a well plate reader system as described herein. In the illustrated example, calibration well plate 1700 is sized similarly to a 96-well well plate and configured for positioning within a corresponding well plate holder. In addition, calibration well plate 1700 provides a representative example for a well plate reader system having four Raman probes. As such, the number and positioning of various calibration samples was selected based on application requirements and may vary based on the particular application and implementation.

In the example of FIG. 17, calibration well plate 1700 includes symmetrically positioned calibration standard samples and calibration wells, each group associated with two probes of a four-probe system. Each group of calibration standard sample includes a diamond calibration sample 1710, a silicon calibration sample 1720, and six wells 1730 that may be filled with any desired liquid calibration sample for a particular application. Sizing of the calibration standard samples may be determined based on commercially available sizes for particular materials.

The present inventors have recognized that the intensity of a sharp Raman band for particular materials may be used for intensity drift monitoring to trigger recalibration. Many materials will degrade under laser exposure and are therefore poor candidates for a calibration standard. As such, diamond was selected as a material that is very stable over significant numbers of laser exposures. In addition, hard materials such as diamond and silicon will provide peaks that vary in intensity depending on the Z-axis position of the probes such that calibration using such materials may be used to adjust the Z-axis focus precision of one or more probes.

Liquid wells 1730 can be loaded with a typical liquid/base used in a particular application, or with any of a number of reference liquids. Reference liquids provide more reliable intensity calibration relative to hard material calibration standards because any Z-axis focus imprecision does not significantly affect the intensity. The Raman peak intensities stay relatively stable for a range of Z-axis focus as long as the light is focused under the surface of the liquid. However, liquid calibration standards will evaporate and may require user intervention to refill associated calibration wells.

Use of different calibration standard sample materials may be helpful to identify one or more components needing adjustment or replacement. For example, a Raman peak of a single material (such as diamond in this example) may be insufficient to diagnosis degradation or changes in various other system components in the optical path of the laser, fiber, probe, spectrometer, etc. Calibration standard sample materials having other peaks and/or multiple peaks (silicon wafer, liquids . . . ) may facilitate diagnosis and subsequent compensation for a particular component related to a corresponding portion of the spectrum.

Many components along the optical path other than the laser or other light source may contribute to inaccurate measurements associated with component failure, misalignment, wear, aging, etc. Laser aging compensation is preferably done automatically without user action, as the laser is the most common and frequent source of inaccuracies. Other conditions such as a damaged filter in the probe, a spectrometer/camera shift, a damaged or broken fiber, a positioning error by the positioning mechanism, etc. may all affect resulting measurements. As such, use of multiple calibration standard samples provided by a calibration plate 1700 provides additional diagnosis and calibration flexibility.

Figure 18:
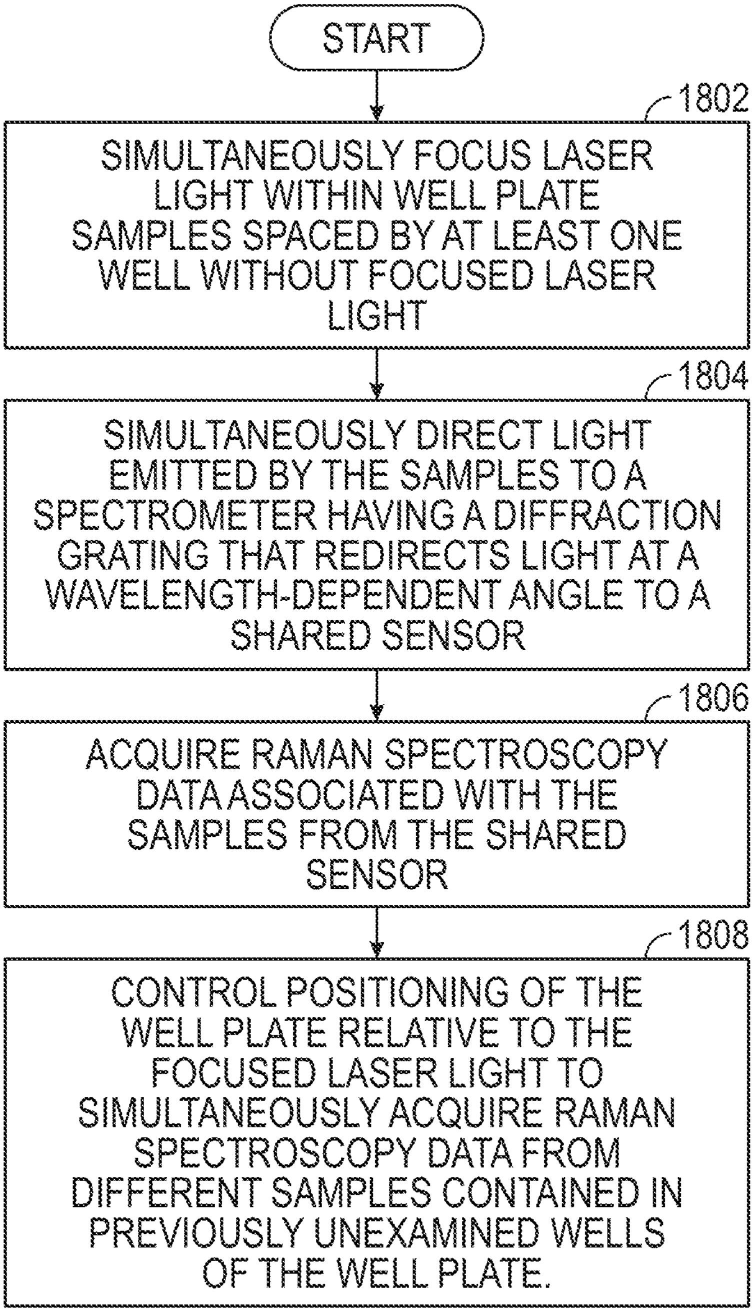
FIG. 18 is a block diagram illustrating operation of a system or method for simultaneous acquisition of spectroscopy measurements.

FIG. 18 is a block diagram illustrating operation of a system or method for simultaneous acquisition of spectroscopy measurements. Control logic or functions performed by one or more controllers or computers is represented in the block diagram, which provides a representative control strategy, logic, or algorithm that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, control module, microcontroller, or computer. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated data, operating variables, and the like.

A system or method may include simultaneously focusing laser light within at least two samples contained in corresponding wells of a well plate, the at least two samples contained in wells spaced by at least one well without focused laser light as represented at 1802. Light emitted by the at least two samples is simultaneously directed to a spectrometer having a diffraction grating that redirects light at a wavelength-dependent angle to a shared sensor as represented at 1804. Block 1806 represents acquiring Raman spectroscopy data associated with the at least two samples from the shared sensor. Block 1808 represents controlling positioning of the well plate relative to the focused laser light to simultaneously acquire Raman spectroscopy data from at least two different samples contained in previously unexamined wells of the well plate.

Simultaneously focusing laser light as represented by block 1802 may include simultaneously focusing light from a different laser associated with each one of the at least two samples. Block 1802 may also include simultaneously directing light from a source to at least two samples contained in corresponding wells of the well plate, each well spaced by at least one well not illuminated by the focused laser light or light from the source. Block 1804 may also include simultaneously directing light emitted by the samples illuminated by the light from the source to the shared sensor of the spectrometer, while block 1806 may include acquiring fluorescence data from the shared sensor of the spectrometer associated with the at least two samples illuminated by the light from the source.

In at least one embodiment, block 1804 includes simultaneously directing light emitted by the at least two samples by coupling the emitted light to at least one optical fiber for each of the at least two samples, and arranging the optical fibers in a linear array at an input of the spectrometer, the optical fibers associated with each sample grouped together and separated from optical fibers associated with another sample by a distance corresponding to at least one optical fiber diameter.

Various embodiments may also include, by the at least one controller, positioning a calibration standard integrated within a well plate holder to be illuminated by the focused laser light, acquiring Raman spectroscopy data from the calibration standard, and adjusting wavelength of the focused laser light based on the Raman spectroscopy data of the calibration standard compared to a previously stored peak wavelength for the calibration standard.

Figure 19:
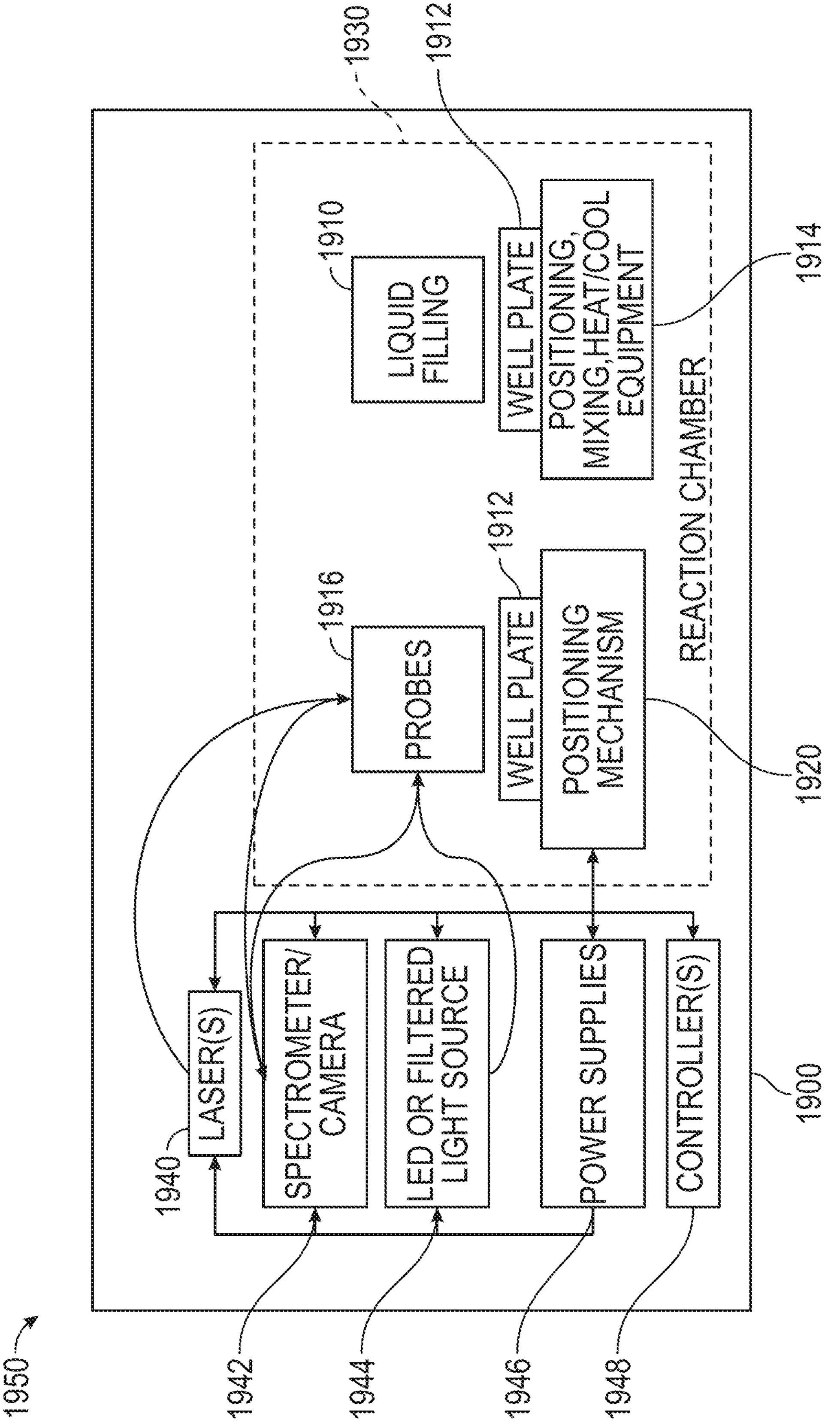
FIG. 19 is a block diagram illustrating integration of a multi-probe spectroscopy system with an automated liquid handling system according to the disclosure.

FIG. 19 is a block diagram illustrating integration of a multi-probe spectroscopy system with an automated liquid handling system according to the disclosure. Automated liquid handling system 1900 (also referred to as an automated lab robot) may include liquid filling equipment 1910 to provide robotic pipetting of liquids into each well of a well plate 1912 within a reaction chamber 1930. Reaction chamber 1930 may provide heating/cooling, mixing, agitation, quenching (dilution) etc. of the liquid samples, and may include a positioning or transit mechanism 1914 to move one or more well plates 1912 within the reaction chamber 1930. Positioning mechanism 1914 may be controlled to position well plate 1912 relative to probes 1916 for spectroscopic analysis as previously described without requiring dilution or quenching of samples for analysis. Alternatively, some applications may include a second positioning mechanism 1920 associated with the spectroscopic analysis section of the reaction chamber 1930, with well plate 1912 transferred from positioning mechanism 1914 to positioning mechanism 1920 for spectroscopic analysis (without dilution or quenching of samples). As also illustrated in FIG. 19, one or more lasers 1940, spectrometer/camera 1942, light source(s) 1944, power supplies 1946, etc. are positioned outside of reaction chamber 1930 and connected by corresponding fibers 1950, wires, etc.

Figure 20:
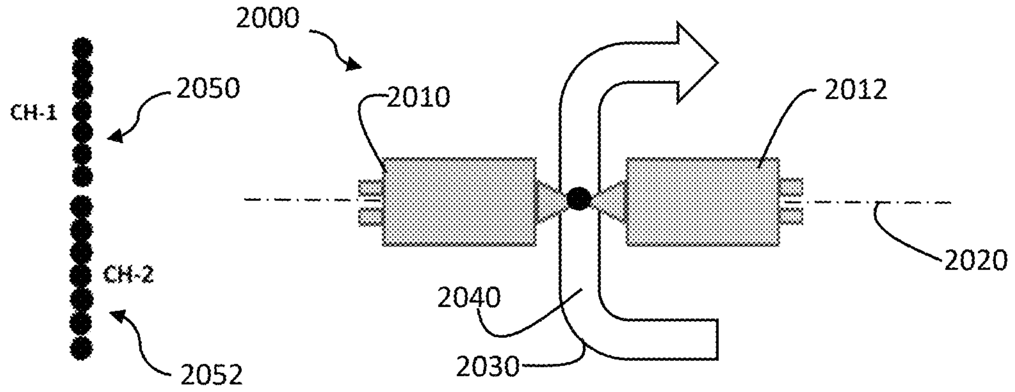
FIG. 20 is a block diagram illustrating a Raman analyzer embodiment with opposing Raman probes focused on the same spot of a moving or flowing liquid sample according to the disclosure.

FIG. 20 is a block diagram illustrating a Raman analyzer embodiment with opposing Raman probes focused on the same spot of a moving or flowing liquid sample according to the disclosure. System 2000 includes at least two Raman probes 2010, 2012 positioned along a common axis on opposite sides of a sample positioning device 2030 guiding a moving or flowing liquid sample 2040. Raman probes 2010, 2012 have respective outputs positioned such that the corresponding output laser light is focused on the same spot of the moving liquid sample 2040 in this representative embodiment. The sample positioning device 2030 may be implemented by tubing, a flow cell, or similar device. The opposing arrangement of Raman probes 2010, 2012 facilitates cross-collection of light from the samples 2040 to increase signal gain or time gain (reduce spectra acquisition time). For example, output light from Raman probe 2010 is acted on by samples 2040 and collected by both Raman probe 2010 and cross-collected by Raman probe 2012. Similarly, output light from Raman probe 2012 is acted on by samples 2040 and collected by both Raman probe 2012 and Raman probe 2010. A signal gain or time gain of 4× relative to a conventional arrangement with a single probe may be achieved by providing each Raman probe 2010, 2012 with a separate laser source and both probes focused on the same spot of the sample. In various embodiments, the laser may be integrated with the Raman probe and contained within the housing of the Raman probe. Additional signal or time gain may be achieved using various combinations of probes and lasers. For example, one laser may be coupled to the input of multiple probes focused at the same spot to provide a gain corresponding to the number of probes, i.e. one laser supplying five probes for 5× gain. The gain could then be increased using additional lasers, i.e. two lasers supplying five probes focused on the same spot for 10× gain, etc.

Figure 29:
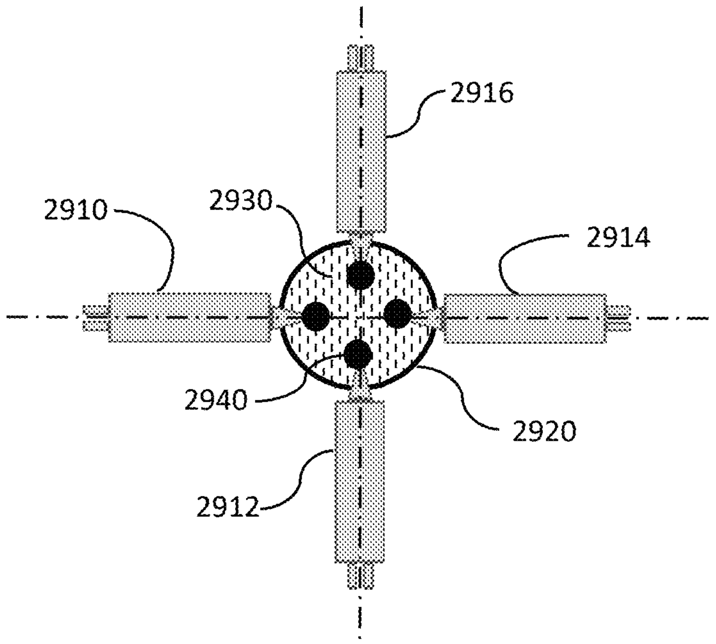
FIG. 29 illustrates another representative embodiment of a Raman analyzer having multiple probes focused at different spots within a liquid sample.

Alternatively, Raman probes may be aligned along a common axis but focused on different spots within the moving liquid as illustrated in FIG. 29. This arrangement may be used where the sample may be altered or damaged by two or more lasers focused on the same spot. Because the probes are focused on different spots, there is little or no cross-collection and the corresponding signal or time gain is reduced accordingly. For example, with two opposing probes that are each coupled to a corresponding laser, signal or time gain would be 2× rather than 4× if both probes were focused at the same spot of the sample.

FIG. 29 illustrates another representative embodiment of a Raman analyzer having multiple probes focused at different spots within a liquid sample. In this embodiment, Raman probes 2910, 2912, 2914, 2916 are positioned perpendicular to a flow cell 2920 at the same position in the plane of the drawing. Flow cell 2920 contains a flowing liquid sample 2930 that flows perpendicular to the plane of the drawing (into or out of the plane). Raman probes 2910, 2912, 2914, 2916 are focused at different spots (indicated generally at 2940) within the sample 2930 such that there is no significant cross collection of signals from opposing probes 2910, 2914 or probes 2912, 2916. In the illustrated example, Raman probes 2910, 2914 are positioned with respective outputs opposing one another along a common axis. Similarly, Raman probes 2910, 2914 are positioned with respective outputs opposing one another along a common axis. Each probe has an associated laser source to provide 4× signal or time gain. As with various other illustrated embodiments, a different number or position of probes may be used depending on the particular application and implementation.

As described with respect to the previous embodiments, the outputs of the at least two Raman probes are input to an imaging spectrometer and imaged on a shared two-dimensional sensor. Each Raman probe output may be coupled by one or more optical fibers to the spectrometer input with the fibers linearly arranged at the spectrometer input. Optical fibers of one Raman probe may be spaced by a distance corresponding to one or more optical fiber diameters from optical fibers of other Raman probes where required to reduce or eliminate crosstalk between the images on the sensor. In the embodiment of FIG. 20, the signals from Raman probes 2010, 2012 may be combined or summed into a single sensor read as both are focused on the same spot of the sample. The spectrometer may include a shared shutterless CCD sensor with the probe inputs imaged in a full vertical bin of the sensor, or the sensor may be operated in two-dimensional mode with the sensor data vertically summed by the at least one controller. A shared CCD sensor may provide a lower cost solution for applications where signals from two or more probes are combined or summed. While not required for these types of applications, the spectrometer may instead include a shared two-dimensional scientific CMOS sensor with similar summing of the sensor signals from two or more probes. Similarly, where probe signals are summed or otherwise combined, the optical fibers 2050, 2052 from different probes may be positioned adjacent to one another in the linear array as crosstalk is not a concern. In one embodiment, each probe has seven (7) optical fibers 2050, 2052 to provide input light to the spectrometer. However, spectrometer input configurations with optical fibers of different probes separated from one another by a distance of one or more optical fiber diameters would also be acceptable although unnecessary.

In general, all embodiments having at least two Raman probes may include a single, higher-power laser with the laser output divided or split between or among two or more probes, a lower-power laser associated with each Raman probe (which may be integrated within the probe housing), lower-power lasers with outputs combined to increase the signal to the input of a single Raman probe, or any combination thereof. The laser configuration, power, etc. may vary based on the particular application requirements and implementation specifics. Similarly, lasers, Raman probes, and the spectrometer may be coupled by one or more optical fibers as described in greater detail herein although free space coupling using associated optical elements of one or more system components may be suitable or acceptable in particular applications or implementations. Similarly, embodiments may include two or more probes focused at the same spot of a sample, or positioned at the same location but focused at different spots within the sample to provide a desired signal or time gain.

Figure 21:
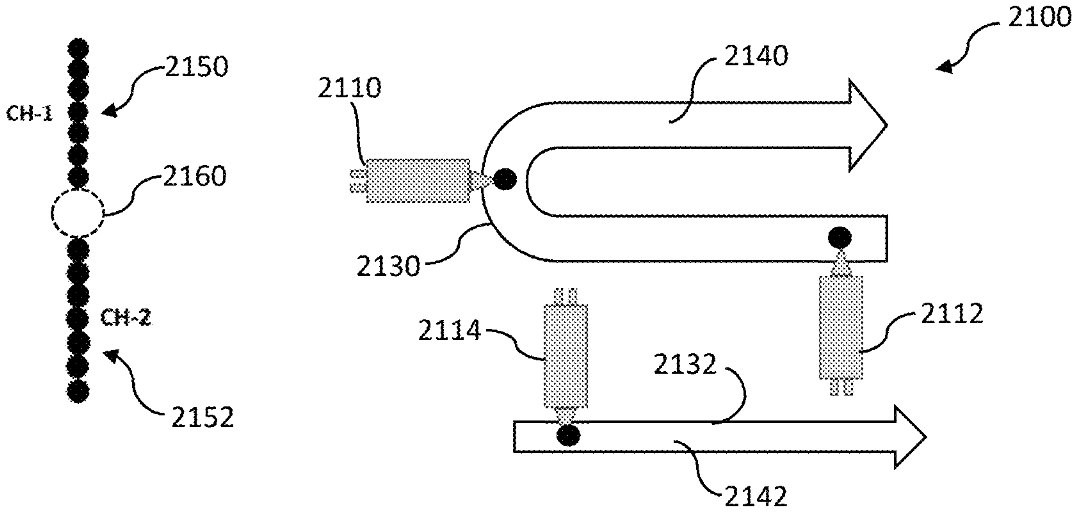
FIG. 21 is a block diagram illustrating a Raman analyzer embodiment with Raman probes focused in different spots or areas of a moving or flowing liquid sample according to the disclosure.

FIG. 21 is a block diagram illustrating Raman analyzer embodiments with Raman probes focused at different spots or areas of a moving or flowing liquid sample according to the disclosure. In a first representative embodiment, system 2100 includes at least two Raman probes 2110, 2112 having outputs focused on different spots of the same flowing liquid samples 2140 within a corresponding sample positioning device 2130. Alternatively, system 2100 may include Raman probes having outputs focused on different flowing liquid samples, such as Raman probe 2210 (and/or 2112) focused on liquid samples 2140 and Raman probe 2114 focused on different liquid samples 2142 flowing through another sample positioning device 2132. As previously described with respect to the embodiments of FIG. 20, the moving or flowing liquid may be contained within tubing, flow cells, vials, or similar material handling equipment to move samples for analysis by Raman probes 2110, 2112, 2114. However, the embodiments of FIG. 21 generally require a spectrometer having a shared two-dimensional scientific CMOS sensor to provide acceptable resolution for individual spectra. A shutterless CCD sensor is not usable in this configuration because a CCD has vertical crosstalk even reading in two-dimensional mode with space between fibers of the two probes preventing independent channel readouts. As such, in addition to use of a shared scientific CMOS sensor, light from the samples delivered by each of the two or more Raman probes to the spectrometer input by one or more optical fibers as represented at 2150 and 2152 should be separated from one another by a distance of at least one optical fiber diameter as represented at 2160 to substantially eliminate crosstalk between the channels. Computer simulation of one embodiment of a two-probe 532 nm system with a spectrometer having a scientific CMOS sensor and F/2.3 optical system indicated no crosstalk with each probe delivering light to the spectrometer via seven (7)-70/77 micrometer optical fibers arranged linearly and separated by five (5) inactive or dead fibers substantially eliminated crosstalk between the probe channels as illustrated and described in greater detail with respect to FIG. 27.

Figure 22:
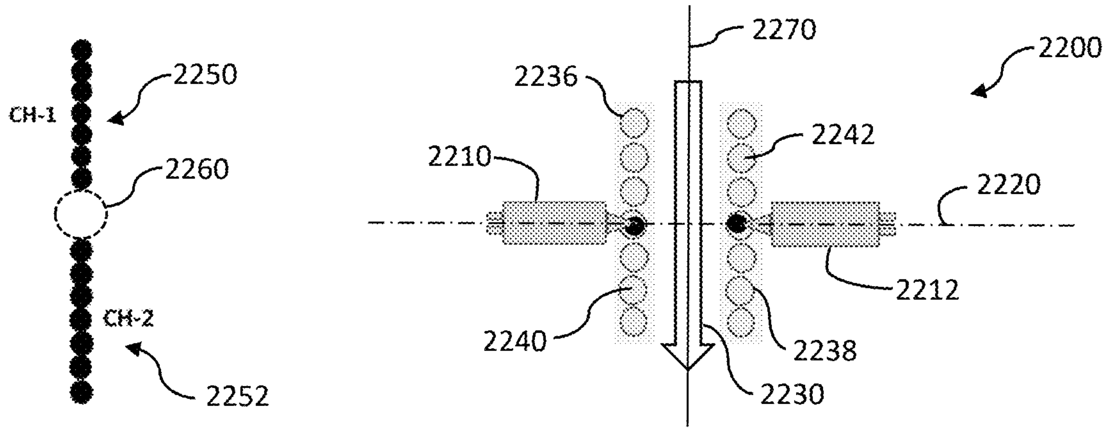
FIG. 22 is a block diagram illustrating a Raman analyzer embodiment with opposing Raman probes focused on different spots of a moving or flowing sample according to the disclosure.

FIG. 22 is a block diagram illustrating a Raman analyzer embodiment with opposing Raman probes focused on different spots of a moving or flowing sample according to the disclosure. System 2200 includes Raman probes 2210, 2212 having outputs aligned along a common axis 2220 with samples 2240, 2242 moving therebetween via a material handling system, generally represented at 2230. Samples 2240, 2242 may be contained in vials or other containers. Unlike the embodiments of FIG. 20, a divider 2270 prevents cross-collection of light by Raman probes 2210, 2212 and simultaneous Raman spectra data are collected from different samples 2240, 2242. As such, the spectrometer in the embodiments represented in FIG. 22 includes a single shared scientific CMOS sensor with input probe fibers 2250, 2252 spaced by one or more optical fiber diameters 2260 to eliminate crosstalk so that signals from both Raman probes 2210, 2212 are read independently and simultaneously.

Figure 23:
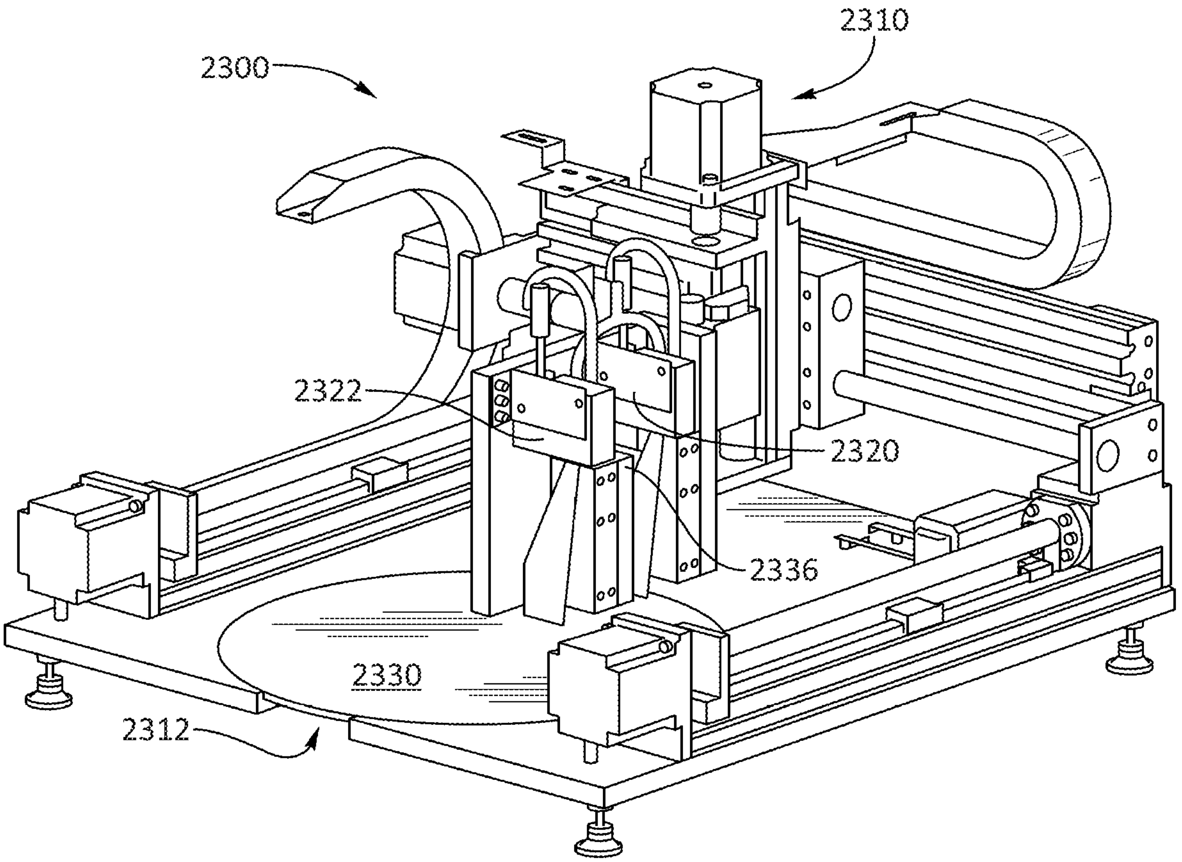
FIG. 23 illustrates a representative embodiment of a Raman analyzer including a sample positioning device and a probe positioning mechanism for analysis of a solid sample according to the disclosure.
Figure 24:
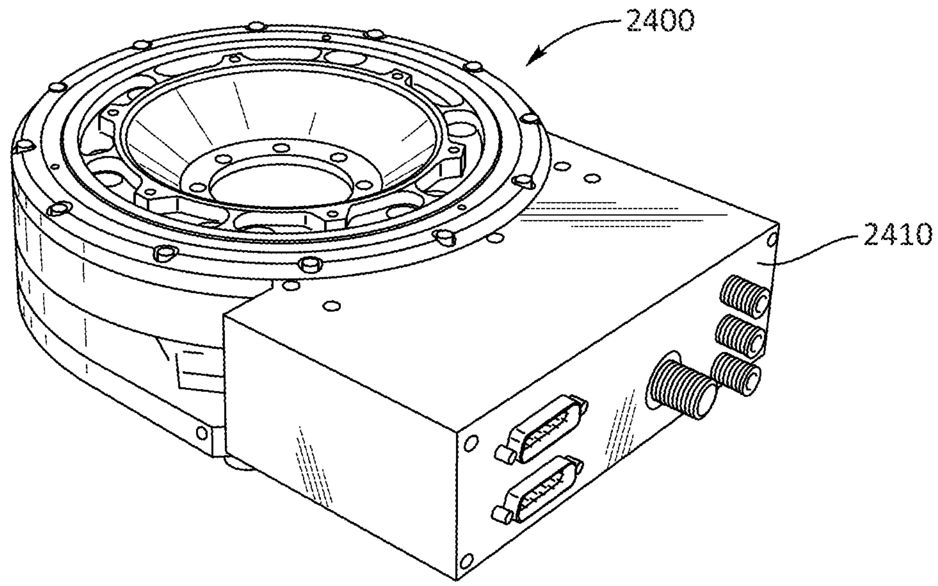
FIG. 24 illustrates a representative embodiment of a sample positioning device including a controllable rotational stage according to the disclosure.
Figure 25:
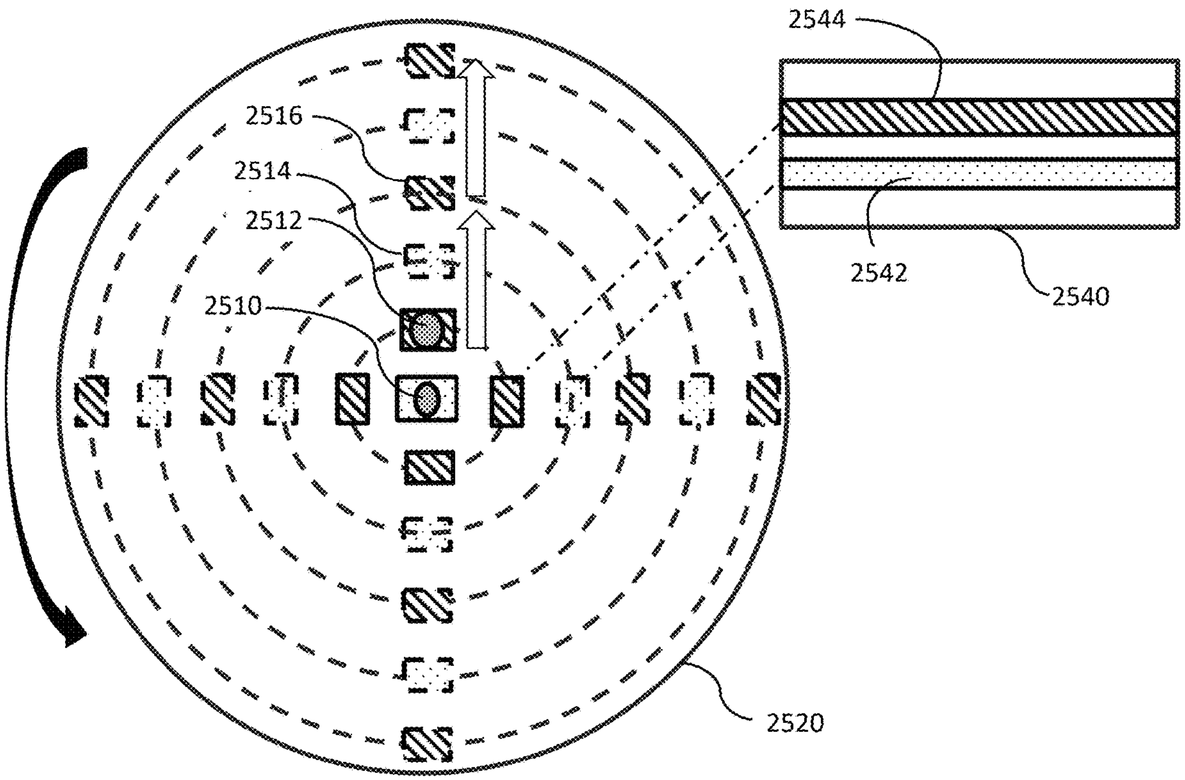
FIG. 25 is a diagram illustrating operation of a system or method for simultaneous acquisition of Raman spectra data from at least two Raman probes using a rotational sample positioning device and a translating probe positioning mechanism.

FIGS. 23-26, 30 illustrate representative embodiments of a Raman analyzer including a sample positioning device and a probe positioning mechanism for analysis of a solid sample according to the disclosure. System 2300 includes a probe positioning mechanism 2310 and a sample positioning device 2312 (such as illustrated in FIG. 24) that cooperate to change relative position between at least two Raman probes 2320, 2322 and a solid sample 2330 as best illustrated in FIGS. 25-26. Probe positioning mechanism 2310 may be used to translate Raman probes 2310, 2312 along at least one axis. In the illustrated embodiment, probe positioning mechanism 2310 can provide translational movement of Raman probes 2310, 2312 along orthogonal X, Y, and Z axes. Raman probes 2310, 2312 may be fixed relative to one another in the X and Y directions with an adjustable Z position to provide an optional autofocus capability. The autofocus function may be based on a distance sensor 2336 that detects distance to the surface of sample 2330. Alternatively, distance or Z-axis position may be adjusted to optimize or maximize the Raman spectra signals. Probes 2310, 2312 may be adjusted in tandem or individually depending on the particular implementation. Autofocus or auto-adjustment may be provided using a corresponding signal from at least one programmed controller based on distance feedback from the distance sensor, or signal strength from the scientific CMOS sensor of the spectrometer, for example. Sample positioning device 2312 may be implemented by a rotational stage 2400 (FIG. 24) having an associated computer control interface 2410 to control rotational position of the sample 2330. At least one controller may be programmed to coordinate control of the probe positioning mechanism 2310 and sample positioning device 2312 to change relative position between the sample 2330 and two or more Raman probes 2320, 2322 to simultaneously generate independent Raman spectra for corresponding spots on the sample. Alternatively, the sample positioning device may be implemented by a second translational stage with translational positioning along one or more axes.

Figures 26A, 26B, 26C:
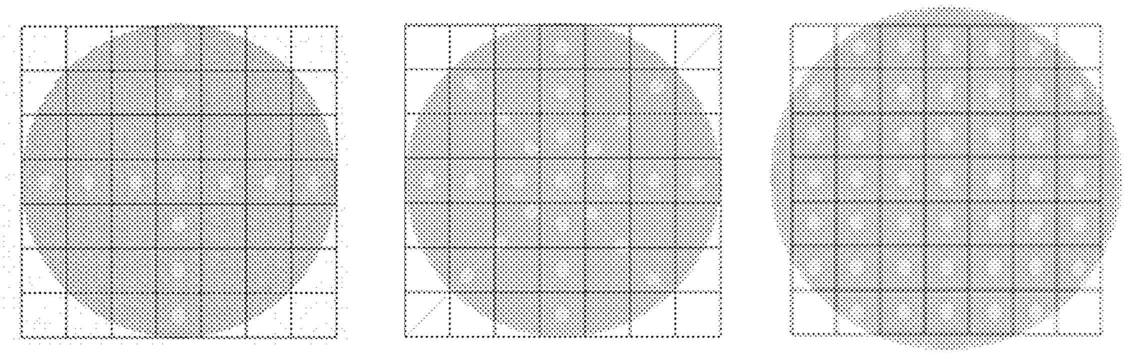
FIGS. 26A-26C illustrate representative locations for sample spots of a solid sample for simultaneous acquisition of Raman spectra according to the disclosure.

FIG. 25 is a diagram illustrating operation of a system or method for simultaneous acquisition of Raman spectra data from at least two Raman probes using a rotational sample positioning device and a translating probe positioning mechanism. As illustrated in FIG. 25, Raman spectra data is acquired simultaneously at two spots 2510, 2512 of a wafer 2520 by corresponding Raman probes as the wafer is rotated by controlling the rotational stage (FIG. 24). The Raman probes are aligned with subsequent sample spots 2514, 2516 by controlling rotation of the wafer 2520 and subsequent sample spots 2522, 2524 by controlling translation of the probes along the X-axis. Various other sampling patterns may be provided as generally represented in FIGS. 26A, 26B, and 26C by controlling the rotational position of the sample wafer 2520 and translational position of the Raman probes. Alternatively, one or more sampling patterns may be produced by maintaining a constant sample position and controlling X-Y axes of the probe positioning mechanism, or maintaining a constant probe position and controlling rotation of the sample. A corresponding graphical representation of the scientific CMOS sensor 2540 recording two Raman spectra simultaneously illustrates rows 2542, 2544 of binned pixels corresponding to the 2 Raman channels.

Figure 27:
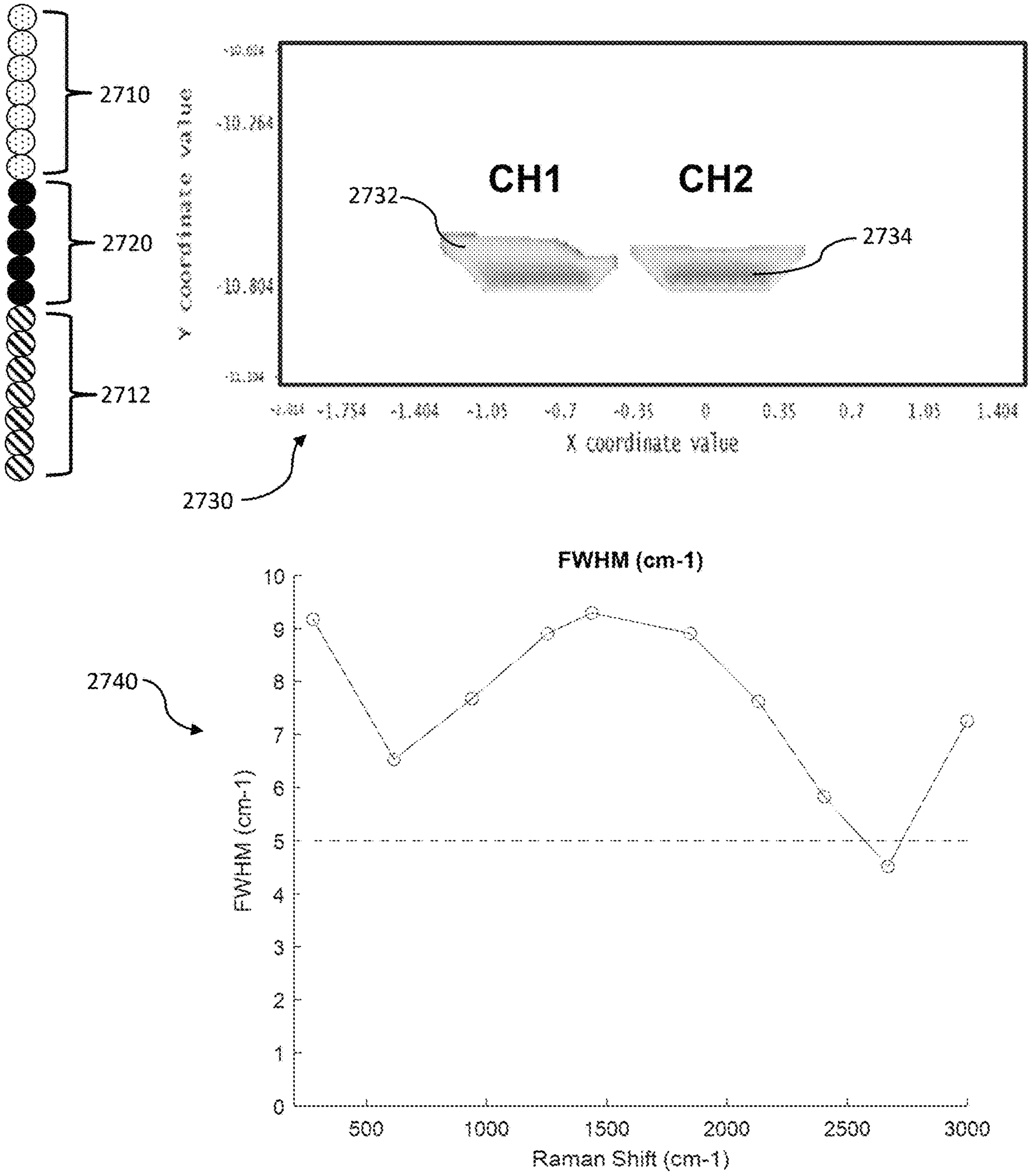
FIG. 27 illustrates results from a software simulation of a representative Raman analyzer embodiment according to the disclosure demonstrating no cross-talk between Raman probe channels sharing a single two-dimensional scientific CMOS sensor.

FIG. 27 illustrates results from a software simulation of a representative Raman analyzer embodiment according to the disclosure demonstrating no cross-talk between Raman probe channels sharing a single two-dimensional scientific CMOS sensor. The results illustrated in FIG. 27 represent a 532 nm dual channel F/2.3 system without crosstalk between two sets of fibers 2710, 2712. Each set of fibers 2710 and 2712 include seven (7)-70/77 micrometer fibers adjacent one another in a linear array and spaced from one another by five (5) inactive fibers 2720 at the spectrometer input slit to provide the illustrated spectral resolution. An entrance slit may not be required depending on the desired spectral resolution for a particular application. As illustrated in the graphical representation 2730, there is no crosstalk between the channel 1 (CH1) image 2732 and the channel 2 (CH2) image 2734 on the scientific CMOS sensor of the spectrometer.

Figure 30:
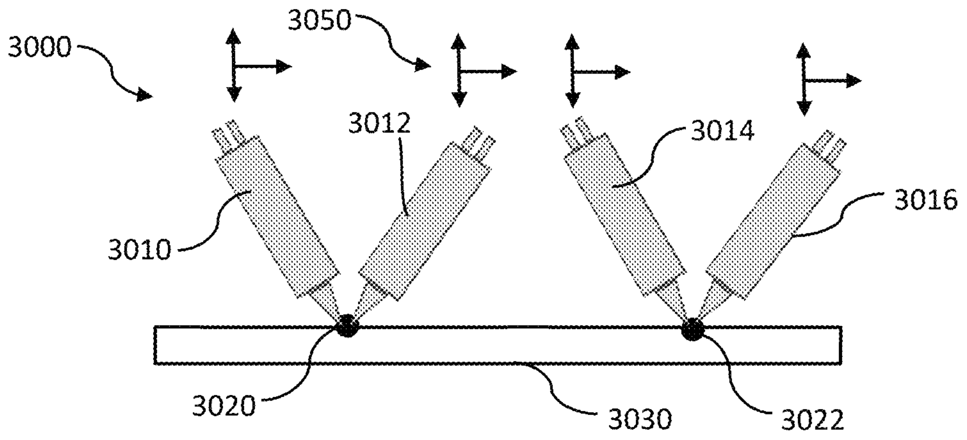
FIG. 30 illustrates another representative embodiment of a Raman analyzer having two or more Raman probes focused at the same spot of a solid sample with cross-collection to increase signal or time gain.

FIG. 30 illustrates another representative embodiment of a Raman analyzer having two or more Raman probes focused at the same spot of a solid sample with cross-collection to increase signal or time gain. System 3000 includes two or more Raman probes having outputs focused on each sample spot. Raman probes 3010, 3012 are positioned to simultaneously illuminate and collect light from a first spot 3020 on solid wafer sample 3030 and Raman probes 3014, 316 are positioned to simultaneously illuminate and collect light from a second spot 3022. As previously described, Raman probes 3010, 3012, 3014, 3016 may have respective inputs coupled to different lasers (one per probe), which may be integrated into the probe in some applications. If the probes are configured for cross-collection (since Raman light is emitted in all directions), this would result in a signal or time gain equal to the number of probes multiplied by the number of lasers, i.e. 4× for each sample spot 3020, 3030 with two probes per spot, cross-collection, and one laser per probe. Alternatively, a single/common laser may be coupled to the inputs of two or more probes 3010, 3012 with a different laser coupled to the inputs of two or more probes 3014, 3016 for applications sensitive to surface damage associated with increased lower power focused on the sample spot. Configurations without cross-collection, with fewer lasers, or with different numbers of probes per sample spot will have corresponding lower signal or time gain as described herein.

As also previously described, a probe positioning mechanism generally indicated by arrows 3050 may be controlled to control positioning of the probes relative to the solid wafer sample 3030. Positioning of probes 3010, 3012, 3014, 3016 may be controlled independently and/or as a unit along one or more orthogonal axes. For example, the probes may have independent z-axis control to adjust the distance between the probes and the sample 3030 while moving together as a unit in x-axis or x,y-axis positioning. Similarly, a sample positioning device may be used to provide rotational positioning and/or positioning along orthogonal x, y, and/or z axes. Probes 3010, 3012, 3014, 3016 may be positioned with outputs perpendicular to the surface of solid wafer sample 3030, such as illustrated in the embodiment of FIG. 23, or may be positioned at an angle as generally represented in FIG. 30.

Figure 28:
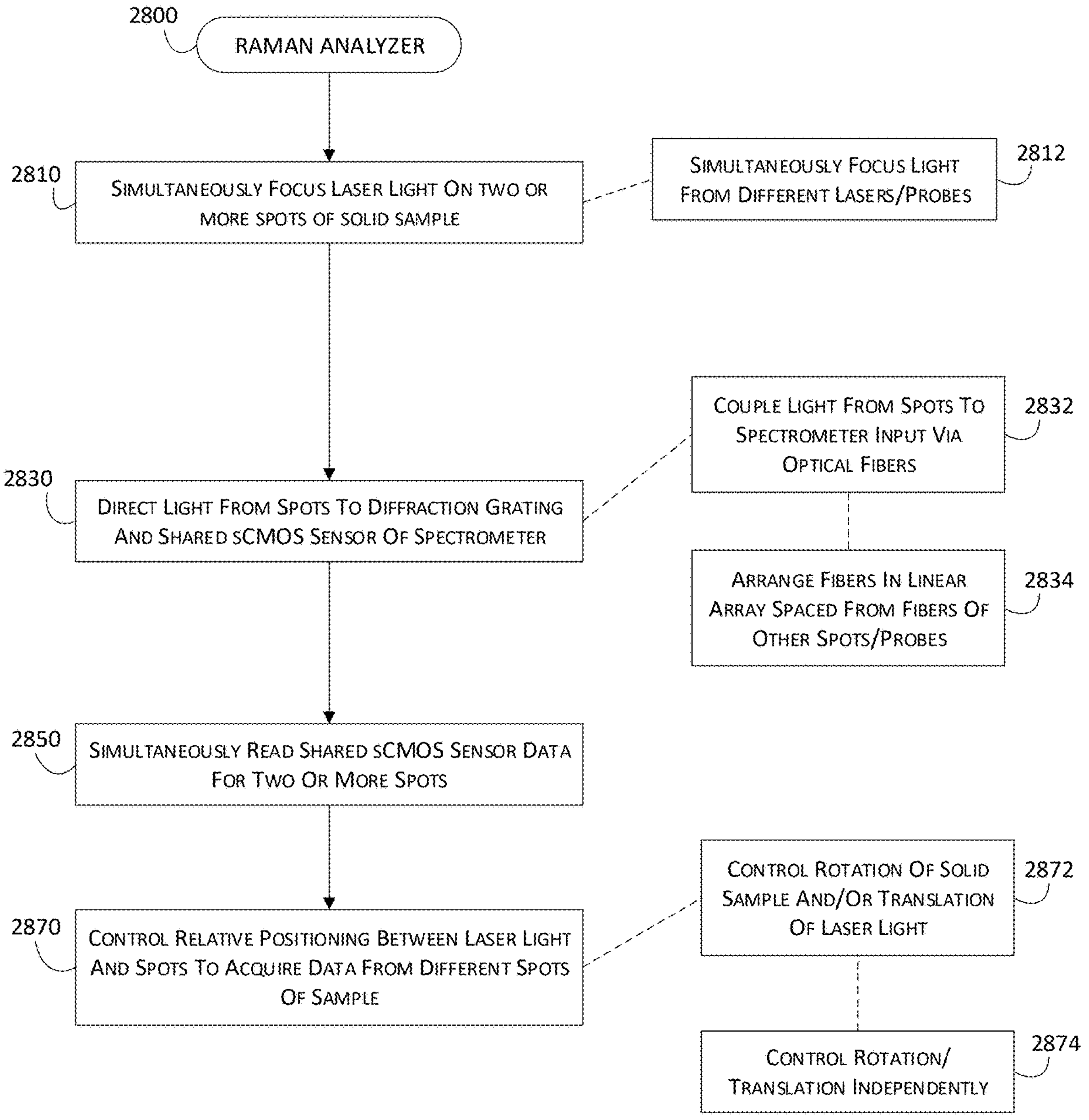
FIG. 28 is a diagram illustrating operation of a Raman analyzer or method for simultaneous acquisition of Raman spectra from two or more spots of a sample according to the disclosure.

FIG. 28 is a diagram illustrating operation of a Raman analyzer or method for simultaneous acquisition of Raman spectra from two or more spots of a sample according to the disclosure. Control logic or functions performed by one or more controllers or computers is represented in the block diagram, which provides a representative control strategy, logic, or algorithm that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, control module, microcontroller, or computer. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated data, operating variables, and the like.

As illustrated in FIG. 28, system or method 2800 includes simultaneously focusing laser light on at least two spots of a solid sample as represented at 2810. This may include simultaneously focusing laser light from a different laser associated with each one of the at least two spots as represented at 2812. The system or method also include simultaneously directing light from the at least two spots to an imaging spectrometer having a diffraction grating that redirects light at a wavelength-dependent angle to a shared two-dimensional scientific CMOS sensor as represented at 2830. This may include coupling the light from each of the spots to at least one corresponding optical fiber as represented at 2832, and arranging the optical fibers in a linear array at an input of the spectrometer with the at least one optical fiber associated with each spot separated from optical fibers associated with another spot by a distance corresponding to at least one optical fiber diameter as represented at 2834. Raman spectroscopy data associated with the at least two spots from the shared two-dimensional scientific CMOS sensor is simultaneously acquired as represented at 2850. The system or method also include controlling, by at least one controller, relative positioning between the sample and the laser light to simultaneously acquire Raman spectroscopy data from at least two different spots of the solid sample as represented at 2870. Controlling relative positioning between the sample and the laser light may include rotation of the solid sample and/or translation of the focused laser light to simultaneously acquire Raman spectroscopy data from at least two different spots of the solid sample as represented at 2872. The rotation of the solid sample may be controlled independently from translation of the focused laser light as represented at 2874.

While representative embodiments are described above and illustrated in the Figures, it is not intended that these embodiments describe all possible forms encompassed by the teachings of the disclosure and currently claimed subject matter. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. A system for obtaining Raman spectra of moving liquid samples, the system comprising:

at least one laser;

at least two Raman probes each positioned along a common axis on opposite sides of the moving liquid samples to illuminate and receive light from a corresponding spot of the moving liquid samples to simultaneously acquire Raman spectra of the samples, each Raman probe including an input optically coupled to the at least one laser, and a sample lens configured to receive light from the input, to focus the light from the input on the corresponding spot of the sample, to collect light from the corresponding spot of the sample, and to direct the collected light to an output;

an imaging spectrometer optically coupled to the outputs of the at least two Raman probes by a plurality of optical fibers, the optical fibers of the at least two Raman probes linearly arranged at an input of the imaging spectrometer, the imaging spectrometer including a diffraction grating configured to direct light collected by the at least two Raman probes to a single two-dimensional sensor; and at least one controller in communication with the at least one laser and the imaging spectrometer, the at least one controller programmed to simultaneously acquire Raman spectra for the corresponding spots of the sample based on signals from the two-dimensional sensor of the spectrometer.

2. The system of claim 1 wherein:

the moving liquid samples comprise liquid moving through a tube positioned between the outputs of the at least two Raman probes;

the at least two Raman probes each have corresponding output laser light focused on the same spot of the moving liquid samples moving through the tube; and the at least one controller is programmed to sum signals from the two-dimensional sensor corresponding to outputs of the at least two Raman probes to generate combined Raman spectra.

3. The system of claim 2 wherein the two-dimensional sensor comprises a shutterless CCD sensor.

4. The system of claim 2 wherein the two-dimensional sensor comprises a scientific CMOS sensor.

5. The system of claim 1 wherein the at least one laser comprises a plurality of lasers, each of the plurality of lasers optically coupled to the input of a single one of the Raman probes.

6. The system of claim 1 wherein the at least one laser comprises a plurality of lasers, wherein each of the plurality of lasers is contained within a housing of a corresponding one of the Raman probes.

7. The system of claim 1 wherein the at least one laser comprises a plurality of lasers with at least two of the plurality of lasers coupled to the input of a single one of the at least two Raman probes.

8. The system of claim 1 wherein the at least one laser comprises a plurality of lasers and wherein at least one of the plurality of lasers is coupled to the inputs of at least two of the Raman probes.

9. The system of claim 1 wherein:

the moving liquid samples comprise vials containing the liquid samples, the vials moving past the outputs of the at least two Raman probes via a material handling system;

the at least two Raman probes have corresponding output laser light focused at a spot within different vials;

the two-dimensional sensor comprises a scientific CMOS sensor;

the optical fibers associated with each Raman probe are positioned adjacent to one another and spaced by a distance corresponding to at least one fiber diameter from fibers associated with other Raman probes; and the at least one controller is programmed to generate separate Raman spectra using signals from the scientific CMOS sensor for each Raman probe read simultaneously and independently.

10. The system of claim 9 comprising a separate laser coupled to the input of each of the at least two Raman probes.

11. The system of claim 1 wherein each of the at least two Raman probes comprises:

a laser;

an achromatic collimating lens positioned to receive light from the laser;

a mirror positioned to receive light from the achromatic collimating lens;

a first dichroic longpass filter configured to reflect light from the mirror having wavelengths below a first cutoff wavelength to the sample lens, and to transmit light from the sample lens having wavelengths above the first cutoff wavelength;

a second dichroic longpass filter configured to transmit light received from the first dichroic longpass filter having wavelengths above a second cutoff wavelength and to reflect light having wavelengths below the second cutoff wavelength; and an achromatic collection lens configured to focus light transmitted through the second dichroic longpass filter to the output.

12. A system for obtaining Raman spectra of flowing liquid samples, the system comprising:

at least two lasers;

at least two Raman probes each positioned along a path of the flowing liquid samples to illuminate and receive light from a corresponding spot of the flowing liquid samples to simultaneously acquire Raman spectra of the samples, each Raman probe including an input optically coupled to a respective one of the at least two lasers, and a sample lens configured to receive light from the input, to focus the light from the input on the corresponding spot of the sample, to collect light from the corresponding spot of the sample, and to direct the collected light to an output;

an imaging spectrometer optically coupled to the outputs of the at least two Raman probes by a plurality of optical fibers, the optical fibers of the at least two Raman probes linearly arranged at an input of the imaging spectrometer with optical fibers associated with each probe positioned adjacent to one another, the imaging spectrometer including a diffraction grating configured to direct light collected by the at least two Raman probes to a single two-dimensional scientific CMOS sensor; and at least one controller in communication with the at least one laser and the imaging spectrometer, the at least one controller programmed to simultaneously acquire Raman spectra for the corresponding spots of the sample based on signals from the two-dimensional CMOS sensor of the spectrometer.

13. The system of claim 12 wherein the Raman probes have outputs aligned along a common axis in opposite directions with the flowing liquid passing between the outputs.

14. The system of claim 13 wherein the at least one controller is programmed to sum the signals from the two-dimensional CMOS sensor to generate combined Raman spectra corresponding to the at least two Raman probes.

15. The system of claim 12 wherein the optical fibers associated with each probe are spaced by a distance corresponding to at least two fiber diameters from fibers associated with other Raman probes coupled to the imaging spectrometer.

16. A method comprising:

simultaneously focusing laser light on at least two spots of a solid sample;

simultaneously directing light from the at least two spots to an imaging spectrometer having a diffraction grating that redirects light at a wavelength-dependent angle to a shared two-dimensional scientific CMOS sensor;

acquiring Raman spectroscopy data associated with the at least two spots from the shared two-dimensional scientific CMOS sensor; and controlling, by at least one controller, rotation of the solid sample and translation of the focused laser light to simultaneously acquire Raman spectroscopy data from at least two different spots of the solid sample.

17. The method of claim 16 wherein simultaneously focusing laser light comprises simultaneously focusing light from a different laser associated with each one of the at least two spots.

18. The method of claim 17 wherein simultaneously directing light from the at least two spots comprises:

coupling the light from each of the spots to at least one corresponding optical fiber; and arranging the optical fibers in a linear array at an input of the spectrometer, the at least one optical fiber associated with each spot separated from optical fibers associated with another spot by a distance corresponding to at least one optical fiber diameter.

19. The method of claim 18 wherein rotation of the solid sample is controlled independently from translation of the focused laser light.

* * * * *